(12) United States Patent
Thorton et al.

(10) Patent No.: US 8,713,358 B2
(45) Date of Patent: Apr. 29, 2014

(54) METHOD AND APPARATUS FOR REBUILDING DATA IN A DISPERSED DATA STORAGE NETWORK

(71) Applicant: Cleversafe, Inc., Chicago, IL (US)

(72) Inventors: Vance T. Thorton, Columbus, OH (US); Jamie Bellanca, Chicago, IL (US); Dustin M. Hendrickson, Biggsville, IL (US); Zachary J. Mark, Chicago, IL (US); Ilya Volvovski, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 0 days.

(21) Appl. No.: 13/914,232

(22) Filed: Jun. 10, 2013

(65) Prior Publication Data
US 2013/0275833 A1 Oct. 17, 2013

Related U.S. Application Data

(63) Continuation of application No. 13/558,008, filed on Jul. 25, 2012, now Pat. No. 8,464,096, which is a continuation of application No. 12/716,106, filed on Mar. 2, 2010, now Pat. No. 8,560,882, which is a continuation of application No. 12/648,691, filed on Dec. 29, 2009, now Pat. No. 8,352,782, which is a continuation-in-part of application No. 11/403,391, filed on Apr. 13, 2006, now Pat. No. 7,546,427, which is a continuation-in-part of application No. 11/241,555, filed on Sep. 30, 2005, now Pat. No. 7,953,937, said application No. 12/648,691 is a continuation-in-part of application No. 12/080,042, filed on Mar. 31, 2008, which is a continuation-in-part of application No. 11/973,542, filed on Oct. 9, 2007.

(60) Provisional application No. 61/141,428, filed on Dec. 30, 2008.

(51) Int. Cl.
*G06F 11/00* (2006.01)

(52) U.S. Cl.
USPC .......................................... 714/6.22; 714/6.24

(58) Field of Classification Search
USPC .............................................. 714/6.22, 6.24
See application file for complete search history.

(56) References Cited

U.S. PATENT DOCUMENTS

| | | | | |
|---|---|---|---|---|
| 6,446,237 | B1 * | 9/2002 | Menon | 714/800 |
| 6,516,425 | B1 * | 2/2003 | Belhadj et al. | 714/6.12 |
| 6,571,351 | B1 * | 5/2003 | Mitaru et al. | 714/6.12 |
| 6,647,514 | B1 * | 11/2003 | Umberger et al. | 714/42 |
| 6,742,081 | B2 * | 5/2004 | Talagala et al. | 711/114 |
| 6,842,422 | B1 * | 1/2005 | Bianchini, Jr. | 370/216 |

(Continued)

*Primary Examiner* — Joshua Lohn
(74) *Attorney, Agent, or Firm* — Garlick & Markison; Timothy W. Markison

(57) ABSTRACT

A method begins a first rebuilder application identifying a data slice having a storage error. The method continues with the first rebuilder application or a second rebuilder application identifying a data segment based on the identified data slice. The method continues with the second rebuilder application identifying one or more other slice servers that are storing other data slices of the encoded data segment. The method continues with the second rebuilder application receiving a sufficient number of the other data slices to reconstruct the data segment and decoding them to reconstruct the data segment. The method continues with the second rebuilder application encoding the reconstructed data segment in accordance with the information dispersal algorithm to produce a new set of data slices and selecting one of them as the rebuild data slice.

13 Claims, 20 Drawing Sheets

(56) References Cited

U.S. PATENT DOCUMENTS

| | | | |
|---|---|---|---|
| 6,959,413 B2* | 10/2005 | Humlicek et al. | 714/807 |
| 6,981,171 B2* | 12/2005 | Hashemi | 714/5.11 |
| 7,146,461 B1* | 12/2006 | Kiselev et al. | 711/114 |
| 7,546,427 B2* | 6/2009 | Gladwin et al. | 711/154 |
| 8,352,782 B2* | 1/2013 | Thornton et al. | 714/6.22 |
| 8,464,096 B2* | 6/2013 | Thornton et al. | 714/6.24 |
| 8,560,882 B2* | 10/2013 | Thornton et al. | 714/6.24 |
| 2002/0062422 A1* | 5/2002 | Butterworth et al. | 711/114 |
| 2002/0166079 A1* | 11/2002 | Ulrich et al. | 714/6 |
| 2003/0120723 A1* | 6/2003 | Bright et al. | 709/203 |
| 2005/0223272 A1* | 10/2005 | Yasuhara | 714/7 |
| 2006/0041782 A1* | 2/2006 | Ali et al. | 714/6 |
| 2006/0218433 A1* | 9/2006 | Williams | 714/6 |
| 2007/0079081 A1* | 4/2007 | Gladwin et al. | 711/154 |
| 2007/0079082 A1* | 4/2007 | Gladwin et al. | 711/154 |
| 2007/0088970 A1* | 4/2007 | Buxton et al. | 714/2 |
| 2008/0183975 A1* | 7/2008 | Foster et al. | 711/153 |

\* cited by examiner

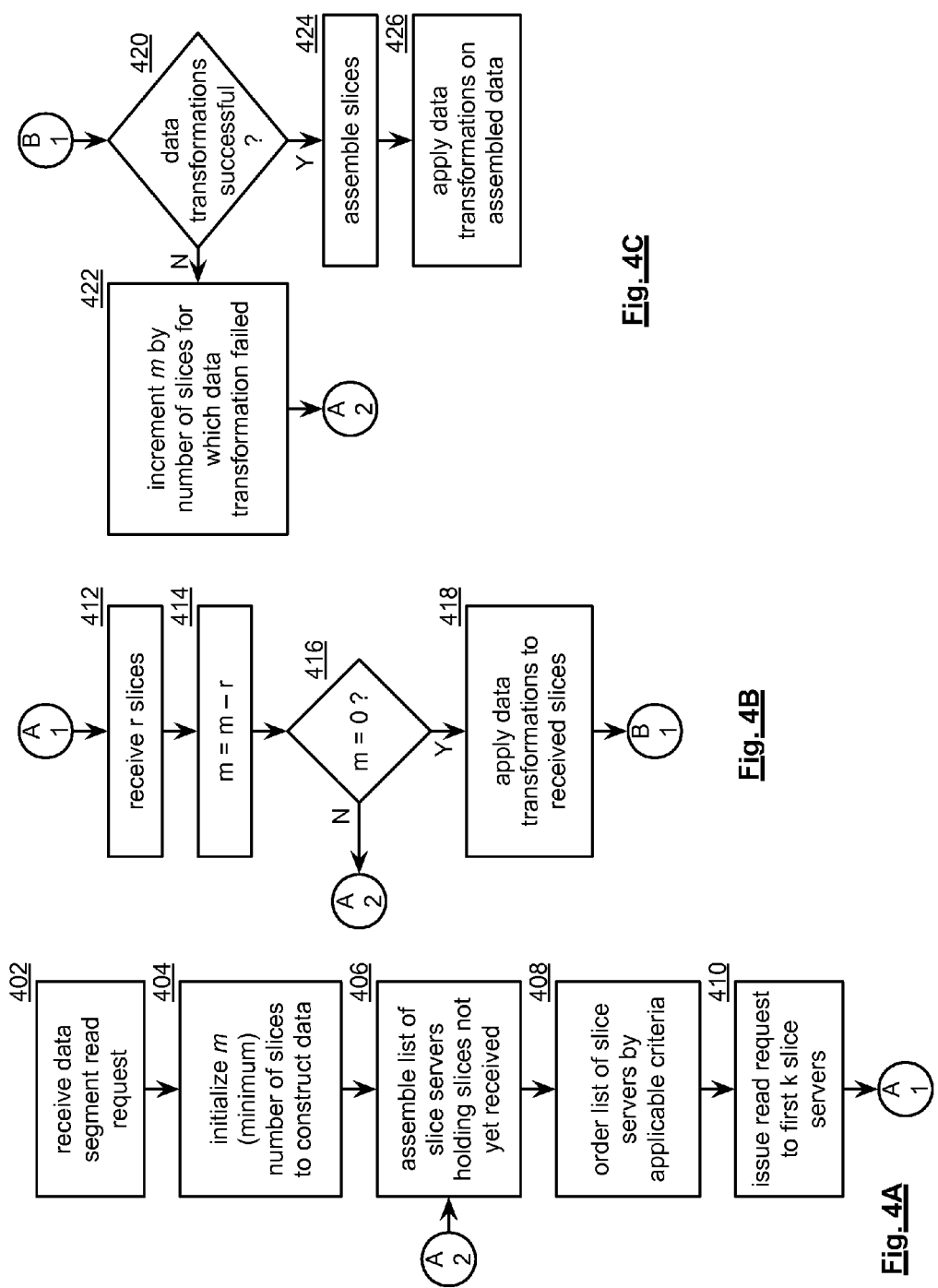

Table 1

| Data Segment | Slice Server A1502 | Slice Server B1504 | Slice Server C1506 |
|---|---|---|---|
| 0 | 100 | 100 | 100 |
| 1 | 99 | (missing) | 99 |
| 2 | 100 | 100 | 100 |
| 3 | 101 | 101 | 100 |
| 4 | 102 | 99 | (checksum corrupted) |

1512
1514
1516
1518
1520

Table 2    Rebuild List

METHOD AND APPARATUS FOR REBUILDING DATA IN A DISPERSED DATA STORAGE NETWORK

CROSS-REFERENCE TO RELATED APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

"Method and Apparatus for Rebuilding Data in a Dispersed Data Storage Network", having a filing date of Jul. 25, 2012, and a serial number of Ser. No. 13/558,008, now U.S. Pat. No. 8,464,096, which claims priority under 35 USC§120 as a continuing patent application to the following U.S. Utility Patent Application which is hereby incorporated herein by reference in its entirety and made part of the present U.S. Utility Patent Application for all purposes:

"Method and Apparatus for Rebuilding Data in a Dispersed Data Storage Network", having a filing date of Mar. 2, 2010, and a serial number of Ser. No. 12/716, 106, now U.S. Pat. No. 8,560,882, which claims priority under 35 USC§120 as a continuing patent application to the following U.S. Utility Patent Application which is hereby incorporated herein by reference in its entirety and made part of the present U.S. Utility Patent Application for all purposes:

"Range Based Rebuilder for Use with a Dispersed Data Storage Network", having a filing date of Dec. 29, 2009, and a serial number of Ser. No. 12/648, 691, now U.S. Pat. No. 8,352,782, which claims priority to the following applications which are hereby incorporated herein by reference in their entirety and made part of the present U.S. Utility Patent Application for all purposes:
1. Pursuant to 35 U.S.C. §119(e) to U.S. Provisional Application No. 61/141,428, entitled "Range Based Rebuilder for Use with a Dispersed Data Storage Network," filed Dec. 30, 2008;
2. Pursuant to 35 U.S.C. §120, as a continuation-in-part (CIP), to the following U.S. Utility Patent Applications:
   a. U.S. Utility Application Ser. No. 11/403,391, entitled "System for Rebuilding Dispersed Data," filed Apr. 13, 2006, now U.S. Pat. No. 7,546,427, which is a continuation-in-part (CIP) to U.S. Utility Application Ser. No. 11/241,555, entitled "Systems, Methods, and Apparatus for Subdividing Data for Storage in a Dispersed Data Storage Grid", filed Sep. 30, 2005, now U.S. Pat. No. 7,953,937; and
   b. U.S. Utility application Ser. No. 12/080,042, entitled "Rebuilding Data on a Dispersed Storage Network," filed Mar. 31, 2008, which is a continuation-in-part (CIP) to U.S. Utility application Ser. No. 11/973,542, entitled "Ensuring Data Integrity on a Dispersed Storage Grid", filed Oct. 9, 2007.

The following applications are also incorporated by reference in their entirety:
1. U.S. Utility application Ser. No. 11/973,621, entitled "Virtualized Data Storage Vaults on a Dispersed Data Storage Network", filed Oct. 9, 2007, now U.S. Pat. No. 7,904,475; and
2. U.S. Utility application Ser. No. 11/973,622, entitled "Smart Access to a Dispersed Data Storage Network", filed Oct. 9, 2007, now U.S. Pat. No. 8,171,101.

FIELD OF THE INVENTION

The present invention relates generally to systems, apparatus, and methods for distributed data storage, and more particularly to systems, apparatus, and methods for distributed data storage using an information dispersal algorithm so that no one location will store an entire copy of stored data, and more particularly still to systems, apparatus, and methods for rebuilding data on a dispersed data storage network that has been damaged, compromised or has experienced failure during read and write operations.

DESCRIPTION OF THE PRIOR ART

Storing data in digital form is a well-known problem associated with all computer systems, and numerous solutions to this problem are known in the art. The simplest solution involves merely storing digital data in a single location, such as a punch film, hard drive, or FLASH memory device. However, storage of data in a single location is inherently unreliable. The device storing the data can malfunction or be destroyed through natural disasters, such as a flood, or through a malicious act, such as arson. In addition, digital data is generally stored in a usable file, such as a document that can be opened with the appropriate word processing software, or a financial ledger that can be opened with the appropriate spreadsheet software. Storing an entire usable file in a single location is also inherently insecure as a malicious hacker only need compromise that one location to obtain access to the usable file.

To address reliability concerns, digital data is often "backed-up," i.e., an additional copy of the digital data is made and maintained in a separate physical location. For example, a backup tape of all network drives may be made by a small office and maintained at the home of a trusted employee. When a backup of digital data exists, the destruction of either the original device holding the digital data or the backup will not compromise the digital data. However, the existence of the backup exacerbates the security problem, as a malicious hacker can choose between two locations from which to obtain the digital data. Further, the site where the backup is stored may be far less secure than the original location of the digital data, such as in the case when an employee stores the tape in their home.

Another method used to address reliability and performance concerns is the use of a Redundant Array of Independent Drives ("RAID"). RAID refers to a collection of data storage schemes that divide and replicate data among multiple storage units. Different configurations of RAID provide increased performance, improved reliability, or both increased performance and improved reliability. In certain configurations of RAID, when digital data is stored, it is split into multiple units, referred to as "stripes," each of which is stored on a separate drive. Data striping is performed in an algorithmically certain way so that the data can be reconstructed. While certain RAID configurations can improve reliability, RAID does nothing to address security concerns associated with digital data storage.

One method that prior art solutions have addressed security concerns is through the use of encryption. Encrypted data is mathematically coded so that only users with access to a certain key can decrypt and use the data. Common forms of encryption include DES, AES, RSA, and others. While modern encryption methods are difficult to break, numerous instances of successful attacks are known, some of which have resulted in valuable data being compromised.

Digitally stored data is subject to degradation over time, although such degradation tends to be extremely minor and the time periods involved tend to be much longer than for analog data storage. Nonetheless, if a single bit within a file comprised of millions of bits changes from a zero to a one or vice versa, the integrity of the file has been compromised, and its usability becomes suspect. Further, errors occur more frequently when digital data is transmitted due to noise in the transmission medium. Various prior art techniques have been devised to detect when a digital data segment has been compromised. One early form of error detection is known as parity, wherein a single bit is appended to each transmitted byte or word of data. The parity bit is set so that the total number of one bit in the transmitted byte or word is either even or odd. The receiving processor then checks the received byte or word for the appropriate parity, and, if it is incorrect, asks that the byte or word be re-sent.

Another form of error detection is the use of a checksum. There are many different types of checksums including classic checksums, cryptographic hash functions, digital signatures, cyclic redundancy checks, and the use of human readable "check digits" by the postal service and libraries. All of these techniques involve performing a mathematical calculation over an entire data segment to arrive at a checksum, which is appended to the data segment. For stored data, the checksum for the data segment can be recalculated periodically, and checked against the previously calculated checksum appended to the data segment. For transmitted data, the checksum is calculated by the transmitter and appended to the data segment. The receiver then recalculates the checksum for the received data segment, and if it does not match the checksum appended to the data segment, requests that it be retransmitted.

In 1979, two researchers independently developed a method for splitting data among multiple recipients called "secret sharing." One of the characteristics of secret sharing is that a piece of data may be split among n recipients, but cannot be known unless at least t recipients share their data, where n≥t. For example, a trivial form of secret sharing can be implemented by assigning a single random byte to every recipient but one, who would receive the actual data byte after it had been bitwise exclusive orred with the random bytes. In other words, for a group of four recipients, three of the recipients would be given random bytes, and the fourth would be given a byte calculated by the following formula:

$$s'=s \oplus r_a \oplus r_b \oplus r_c,$$

where s is the original source data, $r_a$, $r_b$, and $r_c$ are random bytes given to three of the four recipients, and s' is the encoded byte given to the fourth recipient. The original byte s can be recovered by bitwise exclusive-orring all four bytes together.

The problem of maintaining or reconstructing data stored on a digital medium that is subject to damage has also been addressed in the prior art. In particular, Reed-Solomon and Cauchy Reed-Solomon coding are two well-known methods of dividing encoded information into multiple slices so that the original information can be reassembled even if all of the slices are not available. Reed-Solomon coding, Cauchy Reed-Solomon coding, and other data coding techniques are described in "Erasure Codes for Storage Applications," by Dr. James S. Plank, which is hereby incorporated by reference.

Schemes for implementing dispersed data storage networks are also known in the art. In particular, U.S. Pat. No. 5,485,474, issued to Michael O. Rabin, describes a system for splitting a segment of digital information into n data slices, which are stored in separate devices. When the data segment must be retrieved, only m of the original data slices are required to reconstruct the data segment, where n>m.

While dispersed data storage networks can theoretically be implemented to provide any desired level of reliability, practical considerations tend to make this impossible in prior art solutions. For example, dispersed data storage networks rely on storage media to store data slices. This storage media, like all storage media, will degrade over time. Furthermore, dispersed data storage networks rely on numerous transmissions to physically disparate slice servers, and data slices may become corrupted during transmissions. While TCP utilizes a CRC in every transmitted packet, the reliability provided by this CRC is not sufficient for critical data storage.

Since April of 2006, Cleversafe, Inc. of Chicago, Ill. has developed a number of algorithms for rebuilding corrupted or destroyed data stored on a dispersed data storage network. As explained in previous applications, all of which are referenced by this application, these rebuilders worked by noting the corruption, destruction, or unavailability of a data slice based on a scan of stored data slices, or a failed operation on a data slice. This process is effective, but is not optimized to deal with instances where a large number of related data slices are corrupted or destroyed, such as, for example, when a drive is replaced or destroyed.

BRIEF DESCRIPTION OF THE DRAWINGS

FIGS. 4A-4C collectively illustrate a read operation from a dispersed data storage network constructed in accordance with an embodiment of the disclosed invention;

FIG. 15 is an illustration of data that may be maintained by a rebuild process operating in accordance with an embodiment of the disclosed invention;

DETAILED DESCRIPTION OF THE ILLUSTRATED EMBODIMENT

Figure 1:
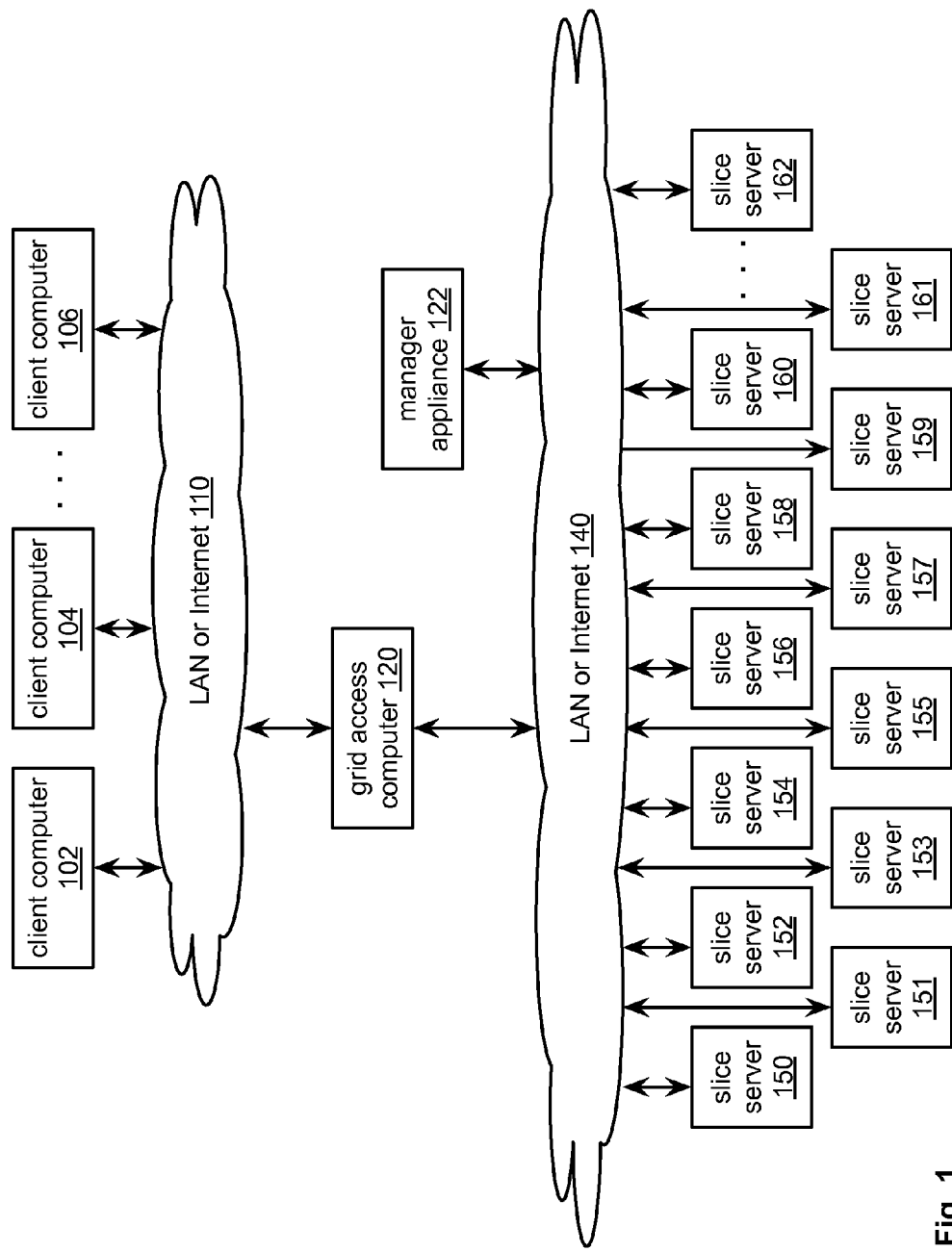
FIG. 1 is a network diagram of a dispersed data storage network constructed in accordance with an embodiment of the disclosed invention.

Turning to the Figures, and to FIG. 1 in particular, a distributed computer system implementing a dispersed data storage network 100 is shown. An arbitrary number of slice servers 150-162 store data slices sent to them by networked client computers 102, 104, and 106. As illustrated, a grid access computer 120 allows access to the slice servers 150-162 by the client computers 102, 104, and 106. In a dispersed data storage network, the grid access computer 120 acts as a router for data sent between a source computer and multiple slice servers 150-162. It manages transactions at the data segment level. A manager appliance 122 monitors the activities and status of the grid access computer 120 and the slice servers 150-162. The manager appliance reports on statistics and events related to appliance health, network throughput, authentication attempts, read and write transaction counts, and rebuilding activities. It notifies users when events that could signal a problem occur.

As explained herein, the disclosed invention works to ensure the integrity of data stored in a dispersed data network not only by using checksums on each stored data segment as well as the constituent data slices, but also by reconstructing compromised data slices as well. In accordance with the disclosed invention, the grid access computer 120 will calculate a checksum for each data segment to be stored, and append the checksum to the data segment prior to slicing. The data segment is then sliced in accordance with an information dispersal algorithm, and checksums are calculated and appended to each of the data slices. The data slices are then forwarded to slice servers 150-162, where the data slices are stored.

In addition, the access computer 120 also recreates data slices that have become corrupted, or were destroyed. If during operation of the dispersed data storage network 100, it is detected that a particular data slice has been corrupted or destroyed, a different data slice will be requested from a different slice server 150-162. Assuming that sufficient non-corrupted data slices exist to successfully reconstruct the original data segment, the reconstructed data segment will be re-sliced, and the corrupted data slice will be replaced with a non-corrupted version. Further, a rebuilder application operating within the dispersed data storage network periodically walks through all data slices stored on the dispersed data storage network. When a corrupted data slice is found, the rebuilder application identifies the data segment corresponding to the corrupted data slice, rebuilds the identified data segment, and rewrites the corrupted slice. Moreover, the rebuilder application actively engages in a detection process to identify corrupted, damaged, missing, and outdated data slices.

Figure 2:
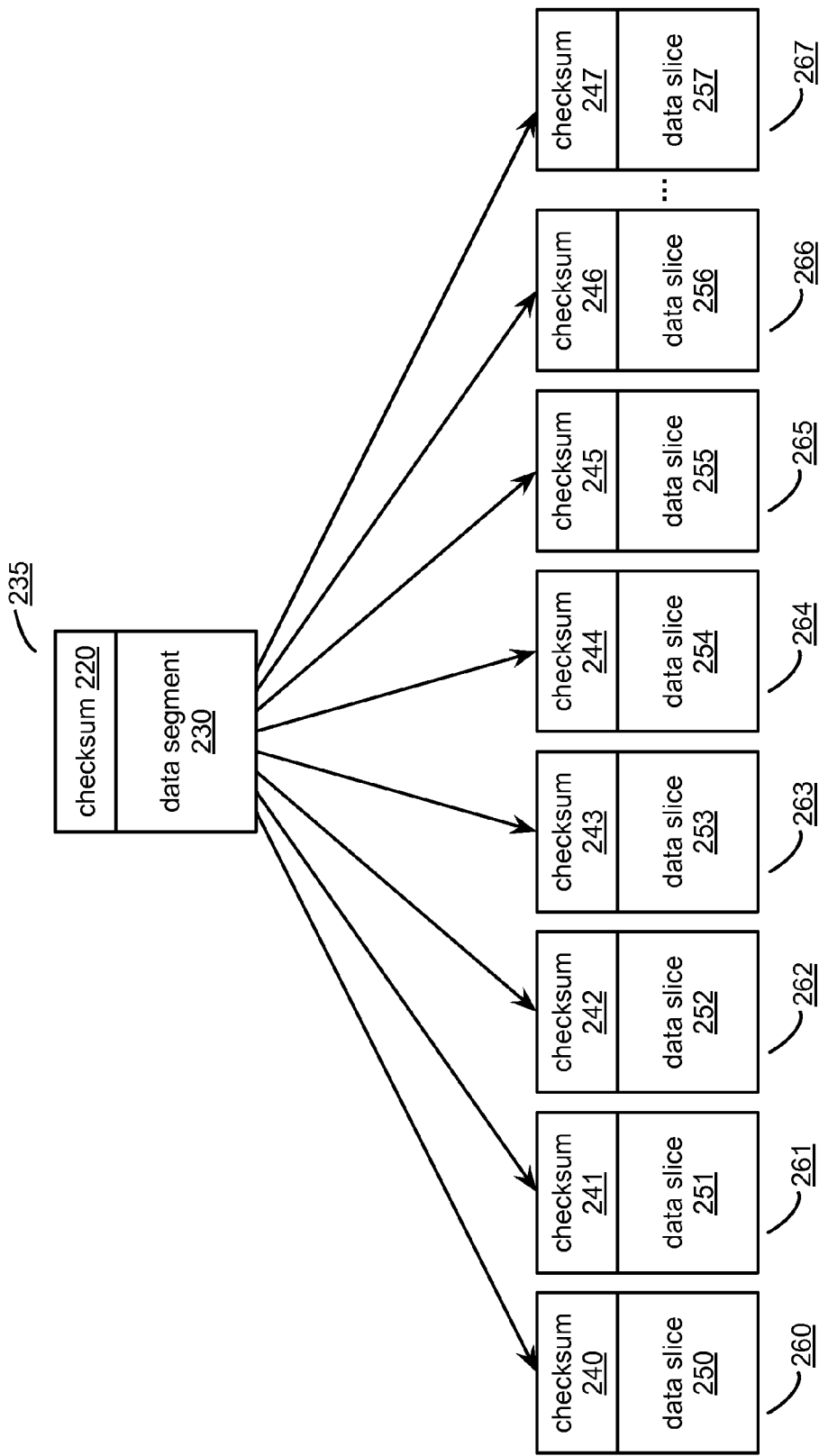
FIG. 2 illustrates the use of checksums on a data segment as well as on an arbitrary number of data slices created from the data segment.

FIG. 2 depicts a system 235 that demonstrates the use of a checksum 220 on a data segment 230, as well as on the data slices 250-257 that the data segment 230 was divided into. Assuming that a data segment 230 is being written to a dispersed data storage network, a checksum 220 will be calculated for and appended to the data segment 230, thereby forming a "certified data segment." The certified data segment 230 will then be sliced as one piece of data resulting in data slices 250-257, i.e., when the data slices 250-257 are recombined, both the data segment 230 and data segment checksum 220 will be recovered. A checksum 240-247 is then calculated for, and appended to each data slice 250-257, forming "certified data slices" 260-267. The certified data slices 260-267 will then be sent to different slice servers.

Figure 3:
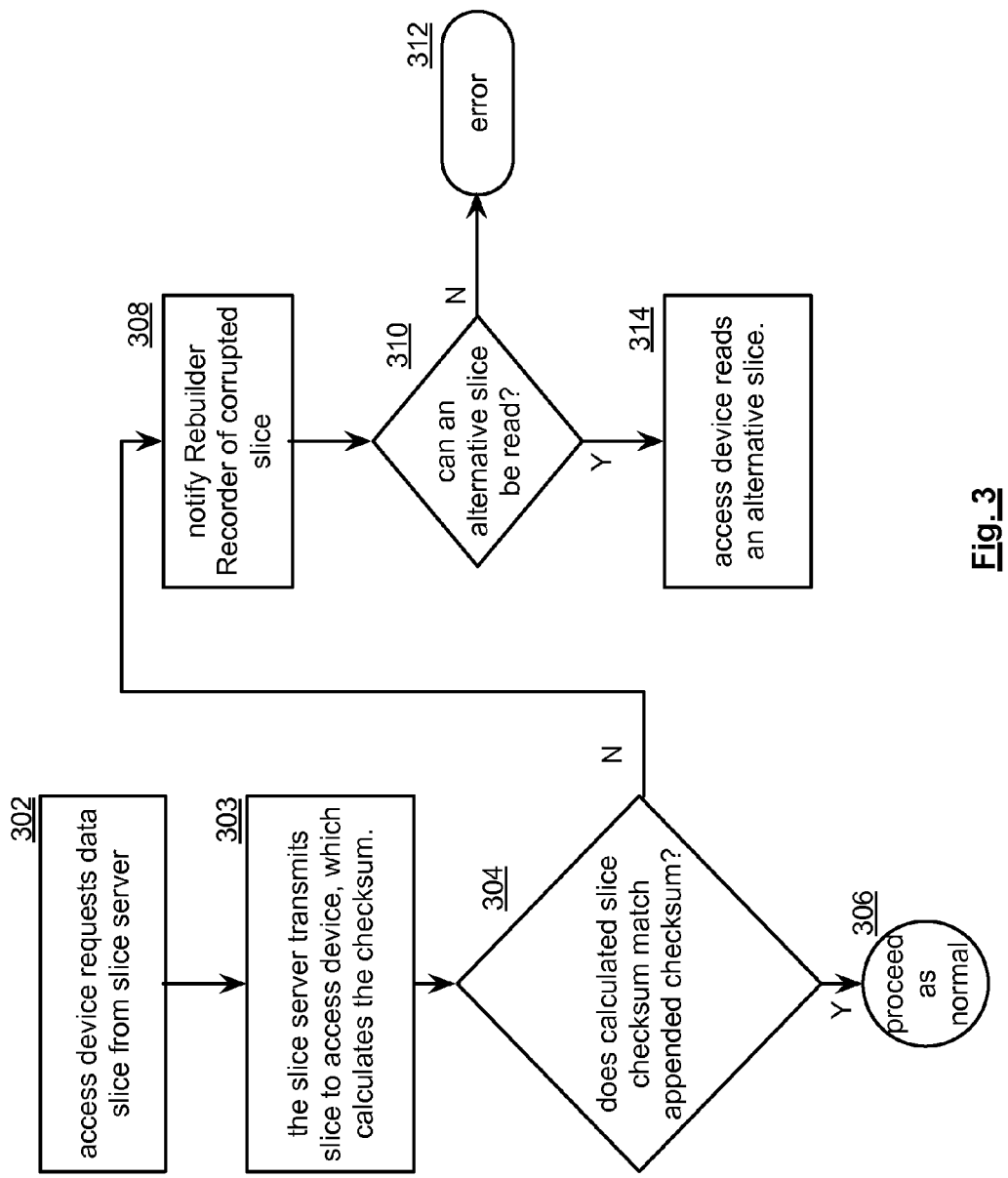
FIG. 3 is a flowchart illustrating the process by which a corrupted data segment can be rebuilt by a dispersed data storage network constructed in accordance with an embodiment of the disclosed invention.

FIG. 3 depicts one possible process by which corrupted slices may be recreated. During a read operation of the dispersed data storage network, a client requests a slice from a slice server in step 302. In step 303, the slice server transmits the requested slice to the client, which calculates a checksum for the requested data slice. In step 304, the calculated checksum is compared to the checksum appended to the stored data slice, and if the two checksums match, the read proceeds as normal in step 306. However, if the two checksums do not match, the slice server will transmit a message to a rebuilder application operating on the dispersed data storage network indicating that the requested data slice is corrupted in step 308, and return "Failure" to the querying server. In step 310, the grid access computer determines if an alternative slice can be read from a different slice server. If an alternative slice does not exist, the grid access computer will report an error in step 312. In step 314, the grid access computer reads the alternative slice.

FIGS. 4A-4C show the process by which a dispersed data storage network, constructed in accordance with the disclosed invention and used in conjunction with the process depicted in FIG. 3, could fulfill a read request. In step 402, a read request is received. Contained within the read request will be information sufficient to determine which slice servers contain applicable data, as well as the minimum number of data slices that must be retrieved before the requested data can be reconstructed. Further information on one method that can be used to associate data requests with particular slice servers is contained in United States Patent application Ser. No. 11/973,621, entitled "Virtualized Data Storage Vaults On a Dispersed Data Storage Network," filed on Oct. 9, 2007 and assigned to Cleversafe, Inc. In step 404, the variable m is initialized to the minimum number of slices required to construct the requested data segment. As described herein, for each successfully received and validated slice, m is decremented.

In step 406, a list of slice servers, each holding a required data slice that has yet to be received, is assembled. In step 408, the list is ordered by any applicable criteria. Further information on criteria by which the list may be ordered is contained in United States Patent application Ser. No. 11/973,622, entitled "Smart Access to a Dispersed Data Storage Network," filed on Oct. 9, 2007 and assigned to Cleversafe, Inc. In step 410, read requests are issued to the first k slice servers on the assembled list, where k is at least equal to m, the minimum number of data slices needed to reconstruct the requested data segment, but could be as large as n, the number of data slices that have data relevant to the requested data segment. In step 412, r data slices are received, and in step 414 the number of received data slices r is subtracted from the variable m. In step 416, m is compared to zero, and if m is greater than or equal to zero, execution returns to step 406 and proceeds as normal from there. However, if m is equal to zero, a collection of data transformations may optionally be applied to the received slices in step 418. The applied data transformations can include decryption, decompression, and integrity checking. In accordance with the disclosed invention, each data slice includes a cyclical redundancy check ("CRC"), or other form of checksum appended to the data contained in the slice. This checksum will be compared against a checksum calculated by the receiving slice server over the received data to ensure that the data was not corrupted during the transmission process.

In step 420, it is determined if the applied data transformations were successful for all of the received data slices. If the applied data transformations were not successful for some of the received slices, m is incremented by this number in step 422, and execution is resumed at step 406. The data transformations could fail, for example, if an integrity check revealed that a received data slice was corrupted. However, if the applied data transformations were successful for all received data slices, the received slices are assembled into the requested block of data in step 424. The same or different data transformations may optionally be applied to the assembled data block in step 426. Step 428 [not on figure] illustrates that the read process is completed. In accordance with the disclosed invention, a checksum for the data segment will be calculated and compared to a checksum appended to the assembled data segment.

Figure 5B:
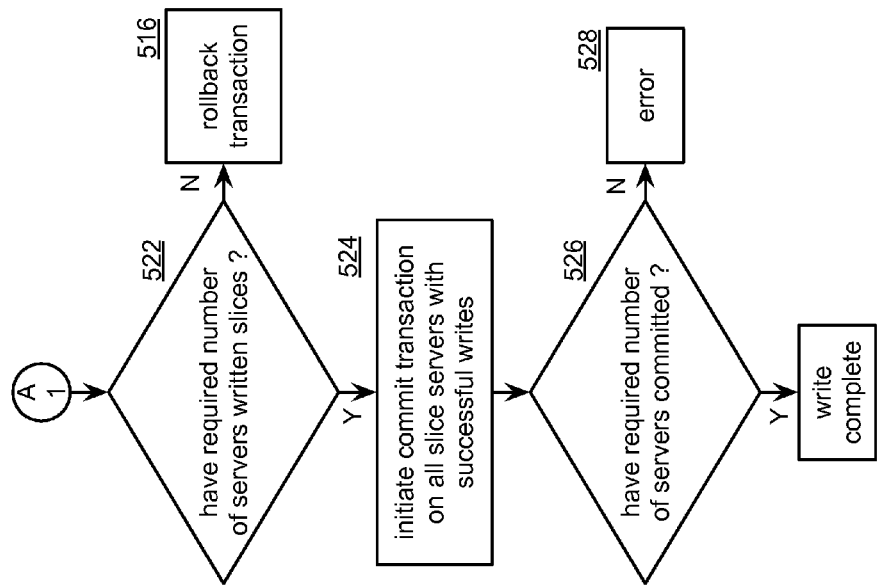
FIGS. 5A-5B collectively illustrate a write operation from a dispersed data storage network constructed in accordance with an embodiment of the disclosed invention.
Figure 5A:
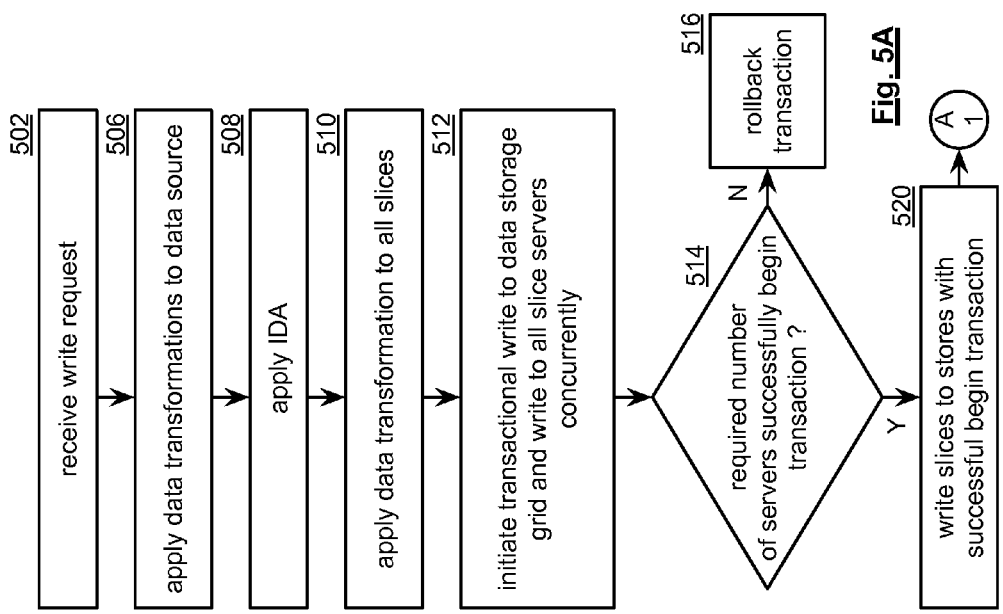

In FIGS. 5A-5B, the process by which a dispersed data storage network, constructed in accordance with the disclosed invention, could write data to a network of slice servers is depicted. In step 502, a data segment write request is received. Included in this write request is information sufficient to determine which slice servers the data segment should be written to, as well as information required by the information dispersal algorithm to divide the data segment, i.e., the number of slices to be written, referred to as n, as well as the minimum number of slices that are required to recover the data, referred to as m. Further information on one method that can be used to associate data writes with particular slice servers is contained in U.S. patent application Ser. No. 11/973,621, titled "Virtualized Data Storage Vaults On A Dispersed Data Storage Network," filed on Oct. 9, 2007 and assigned to Cleversafe, Inc.

A number of data transformations may optionally be applied to each block in step 506, and an information dispersal algorithm is applied in step 508. In particular, the Cauchy Reed-Solomon dispersal algorithm could be applied to the data segment, resulting in a predetermined number of data slices. In step 510, a number of data transformations are optionally applied to each data slice.

In the disclosed system, writes are performed transactionally, meaning that a minimum number of data slices t must be successfully written before a write is deemed complete. Normally, the number of data slices that must be successfully written will be set to the minimum number of slices needed to recreate the data. However, this number can be configured to a greater number, up to the number of slice servers in use. This would allow the user to continue using the dispersed data storage network during a minor network outage where one or more slice servers are unavailable. Slices that could not be immediately transmitted and stored could be queued and transmitted when the network outage cleared. In addition, when a data segment is written to the dispersed data storage network, a transaction identifier is assigned and stored along with each written data slice. As explained later, this transaction identifier is used to ensure that the most recent version of a data segment has been stored to the dispersed data storage network. In step 512, a write transaction is initiated to the data storage network. As discussed herein, all slice servers are simultaneously contacted, and in step 514, a confirmation that at least t receiving slice servers are prepared to begin the write transaction, i.e., to store each slice, must be received, or the transaction is rolled back in step 516.

In step 520 data slices are transmitted to the slice servers that indicated their ability to receive and store slices. The number of slice servers that successfully received and stored their assigned data slices is checked in step 522, and if less than t slices are successfully stored, the transaction is rolled back in step 516. If the result of step 522 is that the stores are successful, then a commit transaction is initiated in step 524 on all servers with successful writes. The required number of servers committed is verified in step 526. If the commit transaction fails, an error is logged in step 528. Otherwise, the write transaction was successful.

Figure 6B:
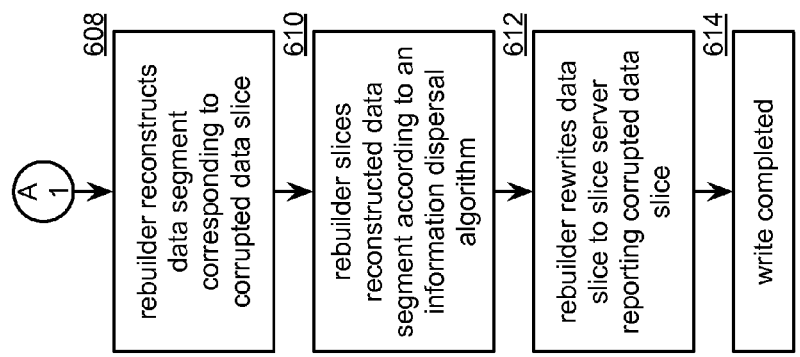
FIGS. 6A-6B collectively illustrate an automated process by which corrupted data slices may be recreated in accordance with an embodiment of the disclosed invention.
Figure 6A:
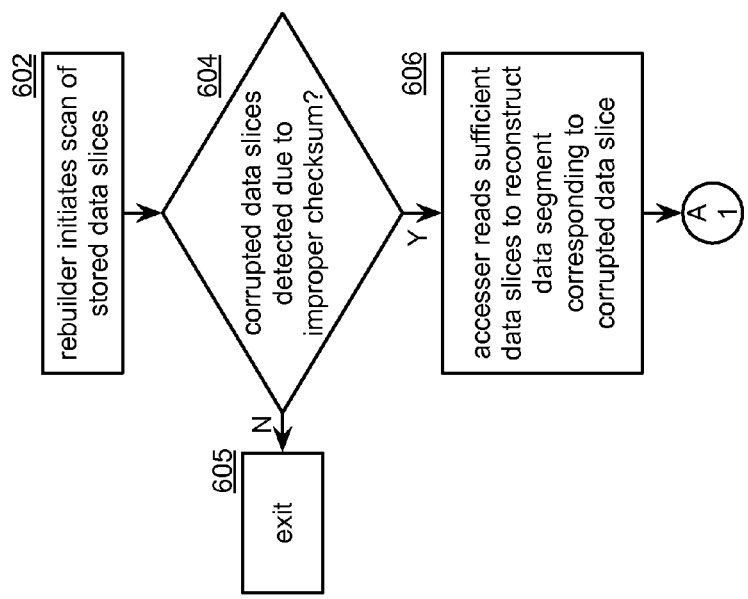

FIGS. 6A-6B are a flow chart illustrating an alternative process by which corrupted data slices may be recreated. In step 602, a scan of data slices is initiated by a rebuilder application operating somewhere on the dispersed data storage network, such as the grid access computer, the monitor appliance, or one or more slice servers. If no corrupted data slice is found at step 604, the corrupted slice recreation process is exited in step 605. However, if a corrupted slice is detected because of a failed integrity check, execution proceeds to step 606, where the rebuilder application determines what data segment corresponds to the corrupted data slice, and reads that data segment from the dispersed data storage network. The rebuilder application then reconstructs the data segment in step 608. In step 610, the data segment is re-sliced, and the rebuilder application rewrites a non-corrupted version of the corrupted data slice to the appropriate slice server in step 612. The process exits after the write has been completed.

The rebuilder application is responsible for ensuring that the integrity of all stored data segments is maintained. As such, the rebuilder application has access to a data store identifying every data segment stored by the dispersed data storage network. Note that referring to the rebuilder application as singular is solely for convenience; a system implementing the disclosed invention could be constructed using multiple rebuilder applications, each responsible for maintaining some subset of the stored data segments.

Figure 7:
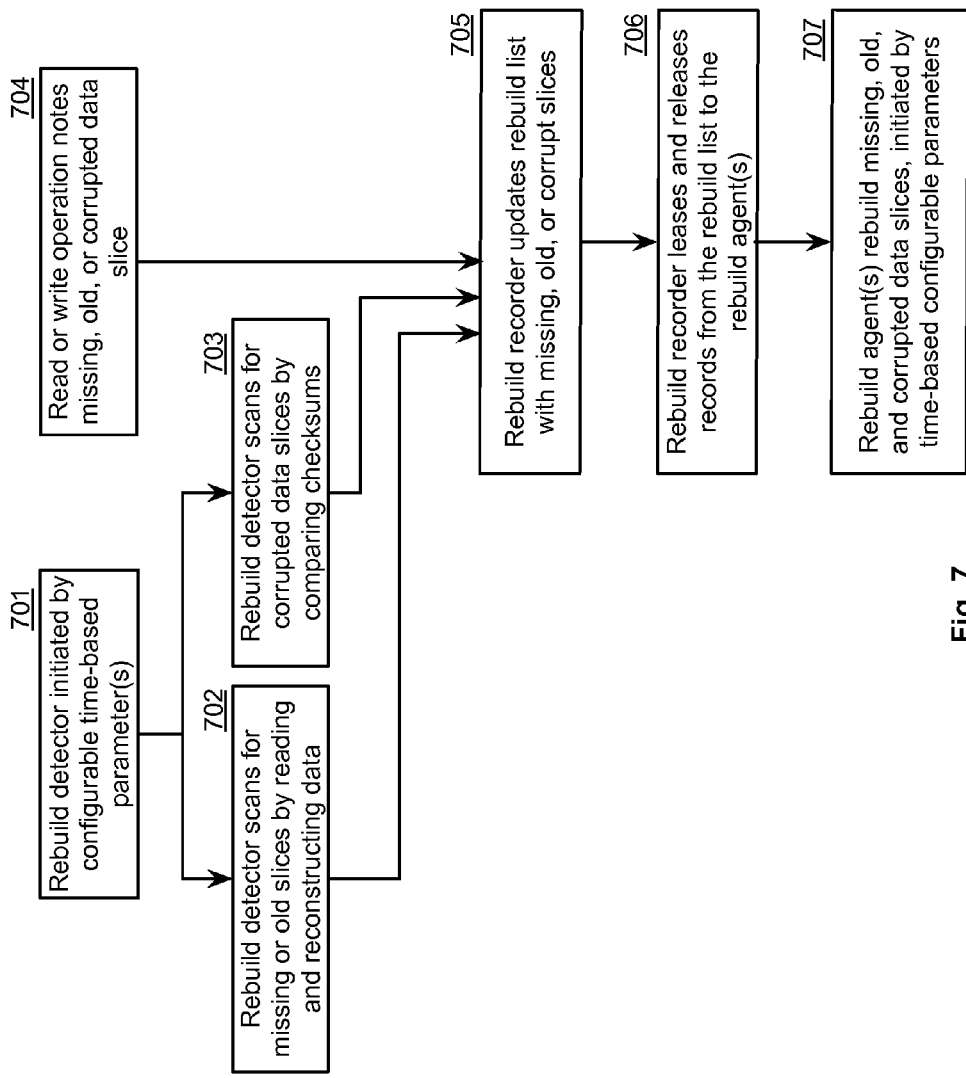
FIG. 7 is a flowchart illustrating the high-level operation of a rebuild process in accordance with an embodiment of the disclosed invention.

FIG. 7 illustrates the high-level operation of the rebuild process, and in particular, the interactions of the following components of the rebuilder application: the rebuild agent, the rebuild recorder, and the rebuild detector.

The rebuild agent executes rebuild operations. In order to rebuild a data segment, the following operations are performed: 1) some or all of the available data slices for that data segment are read; 2) information dispersal algorithms are used to obtain a pre-dispersal form of the data segment; 3)

information dispersal algorithms are used to generate restored versions of the previously missing/corrupted data slices; and 4) the restored data slices are written to the appropriate slice servers. When performing slice write operations, the rebuild agent will indicate the transaction identifier of the slices being written. The slice servers will use this identifier to ensure that slices are not overwritten if their transaction identifiers are greater than those specified.

Figure 13:
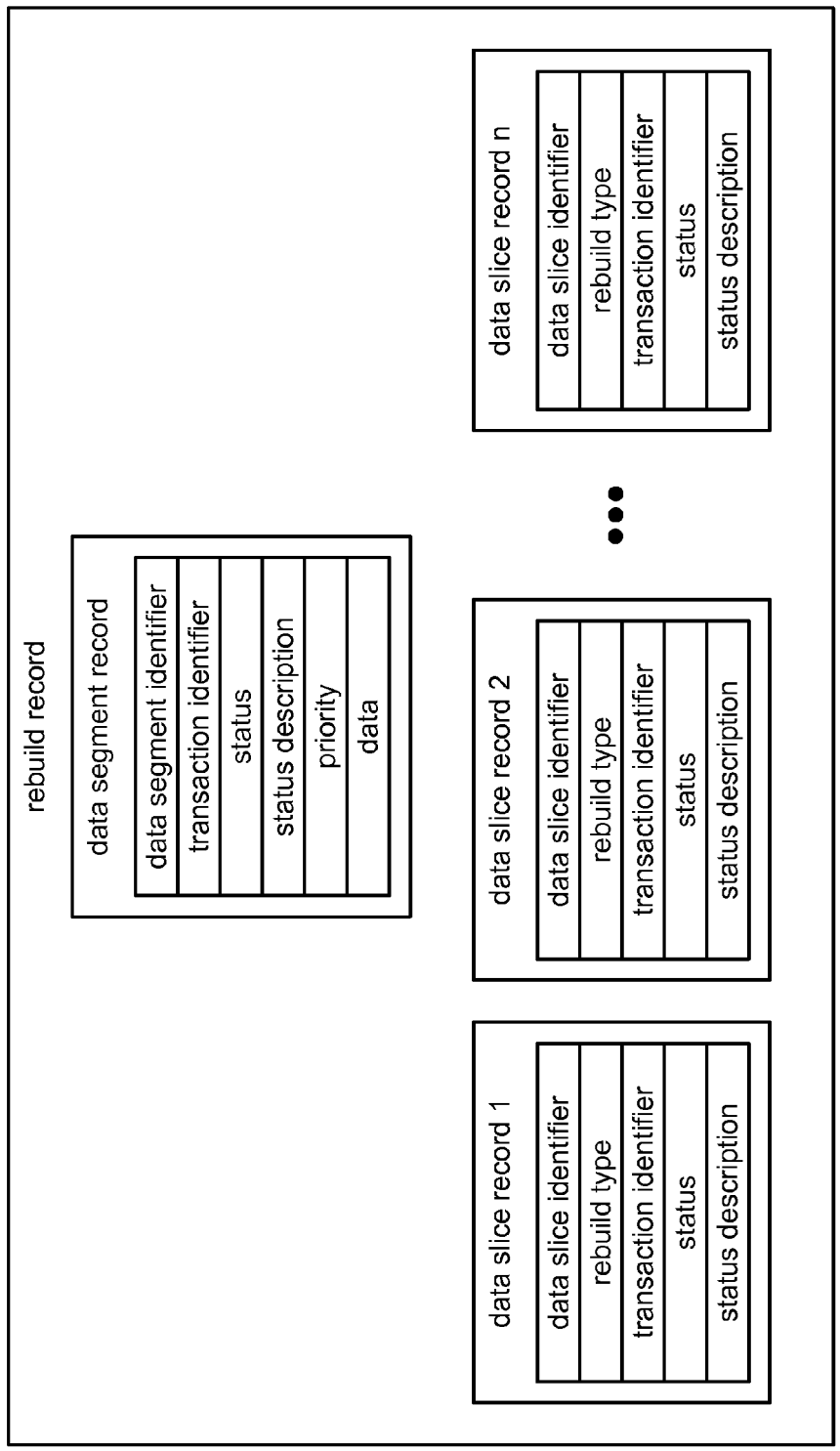
FIG. 13 is an example layout of a rebuild record, which stores the identities and other information used to manage the record of data slices that need to be rebuilt.

The rebuild recorder stores information about data segments that have been identified as potentially needing to be rebuilt. This information is represented using "Rebuild-Records." A RebuildRecord consists of an identifier associated with the data segment to be rebuilt, the transaction identifier associated with the data segment to be rebuilt, and the identifiers of the data slices that are associated with the data segment to be rebuilt. The rebuild recorder is responsible for providing rebuild records to rebuild agents, which actually perform the rebuilding operation. FIG. 13 depicts one possible implementation of a RebuildRecord. Each RebuildRecord will include one data segment record, which may include a data segment identifier, a transaction identifier, the status of any rebuild operation, a status description for any rebuild operation, the priority of any rebuild operation, and any other data associated with the data segment to be rebuilt. Each RebuildRecord will also include one or more data slice records, which may include a data slice identifier, the type of rebuild operation, a transaction identifier, the status of the rebuild operation, and a status description of the rebuild operation. The transaction identifier indicates the transaction on which the data segment or data slice was stored. Status indicates the progress of the rebuild operation; for example, PENDING, ACTIVE, COMPLETE, or FAILED. Rebuild type indicates how a particular data slice was compromised; for example, MISSING, OUTDATED, CORRUPTED, or UNKNOWN.

The rebuild detector actively discovers data slices that have been compromised in some way. For example, the rebuild detector is able to detect missing and outdated slices by downloading a list of slices from each slice server and comparing those lists. The rebuild detector can also detect corrupted data slices by verifying the checksums of all data slices. This executes on each slice server in parallel.

In addition, the activities of the rebuild detector, recorder, and rebuild agent generate statistics that are useful in monitoring the health of the dispersed data storage network. Examples of such statistics are number of RebuildRecords in the list, the time it takes to rebuild one slice, or the number of slices being rebuilt per second. These statistics can then be viewed on the manager appliance, or other similar monitoring agent.

In step 701, the rebuild detector is triggered by some mechanism, such as the expiration of a timer based on configurable parameters related to frequency of rebuild, idle time in relation to other operations, and other parameters. The rebuild detector utilizes two separate types of scans.

In step 702, the rebuild detector scans by attempting to read and reconstruct each data segment from its constituent data slices. During the scanning process, the rebuild detector may notice that a particular data segment has data slices with different transaction identifiers, indicating that one or more of the data slices were not updated during a write, and therefore, that multiple versions of the same data segment are stored. The data slices with outdated transaction identifiers will be identified as compromised. It may also discover missing data slices. If it notes that a particular data slice in a data segment is missing or outdated, it passes the data slice to the rebuild recorder in step 705.

In step 703, the rebuild detector scans by looking directly at the slices on the slice servers, computing new checksums, and comparing to the stored checksum. If the computed checksum for a particular data slice does not match the checksum appended to the data slice, the identifying information for the data slice will be passed to the rebuild recorder in step 705.

In step 704, during normal read operations, if a missing, outdated, or corrupted data slice is read, the data slice identifier corresponding to the compromised data slice is passed to the rebuild recorder in step 705. In addition, during normal write operations, if a data segment cannot be written to all of the slice servers, the data slices that were not written are passed to the rebuild recorder in step 705.

In step 705, the rebuild recorder generates the necessary data and forms or updates a RebuildRecord, which is appended to the rebuild list, based on the compromised data slices it has identified. In step 706, the rebuild recorder leases records from the list to a rebuild agent, which in step 707 rebuilds the data. The rebuilding of the data is done by reading enough slices to reconstitute a data segment, re-slicing the data segment, and storing the needed slices, resulting in a complete and correct data segment.

Concerning the operation of the rebuild agent or agents, a single rebuild agent could handle all data slice rebuilding for a rebuilder application. Alternatively, a new process or thread could be created for each data slice to be rebuilt. In yet another alternative, a fixed stable of rebuild processes or threads could be spawned or instantiated when the rebuilder application was executed and rebuild records would then be passed to available rebuild agents as they finished rebuilding a compromised data slice.

Figure 8:
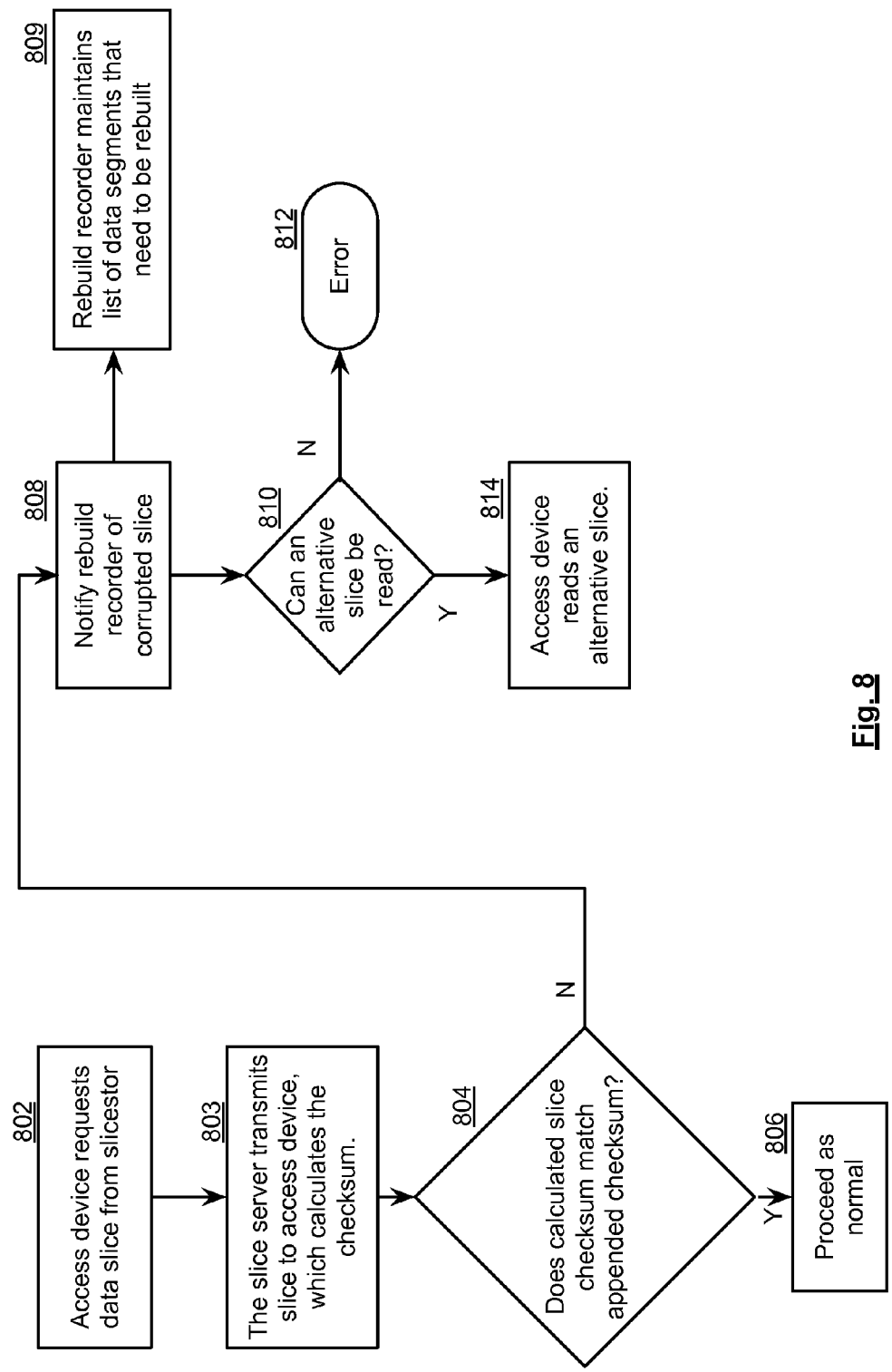
FIG. 8 is a flowchart illustrating a process for discovery of corrupt data occurring during the course of a normal read operation, in accordance with an embodiment of the disclosed invention.

FIG. 8 depicts a normal read operation from a dispersed data storage network, illustrating in particular the process by which corrupted slices may be discovered during the read. During the read operation, an access device requests a slice from a slice server in step 802. In step 803, the slice server transmits the requested slice to the access device, which calculates a checksum for the requested data slice. In step 804, the calculated checksum is compared to the checksum appended to the stored data slice, and if the two checksums match, the read proceeds as normal in step 806. However, if the two checksums do not match, the read operation will pass a message to the rebuilder application operating on the dispersed data storage network indicating that the requested data slice is corrupted in step 808. The rebuild recorder in step 809 inserts a RebuildRecord with the requested data slice's data slice identifier and an indication that the requested data slice is corrupted into its rebuild list so the identified data slice may rebuild. In step 810, the grid access computer determines if an alternative slice can be read from a different slice server. If an alternative slice does not exist, the grid access computer will report an error in step 812. In step 814, the grid access computer reads the alternative slice.

Figure 9:
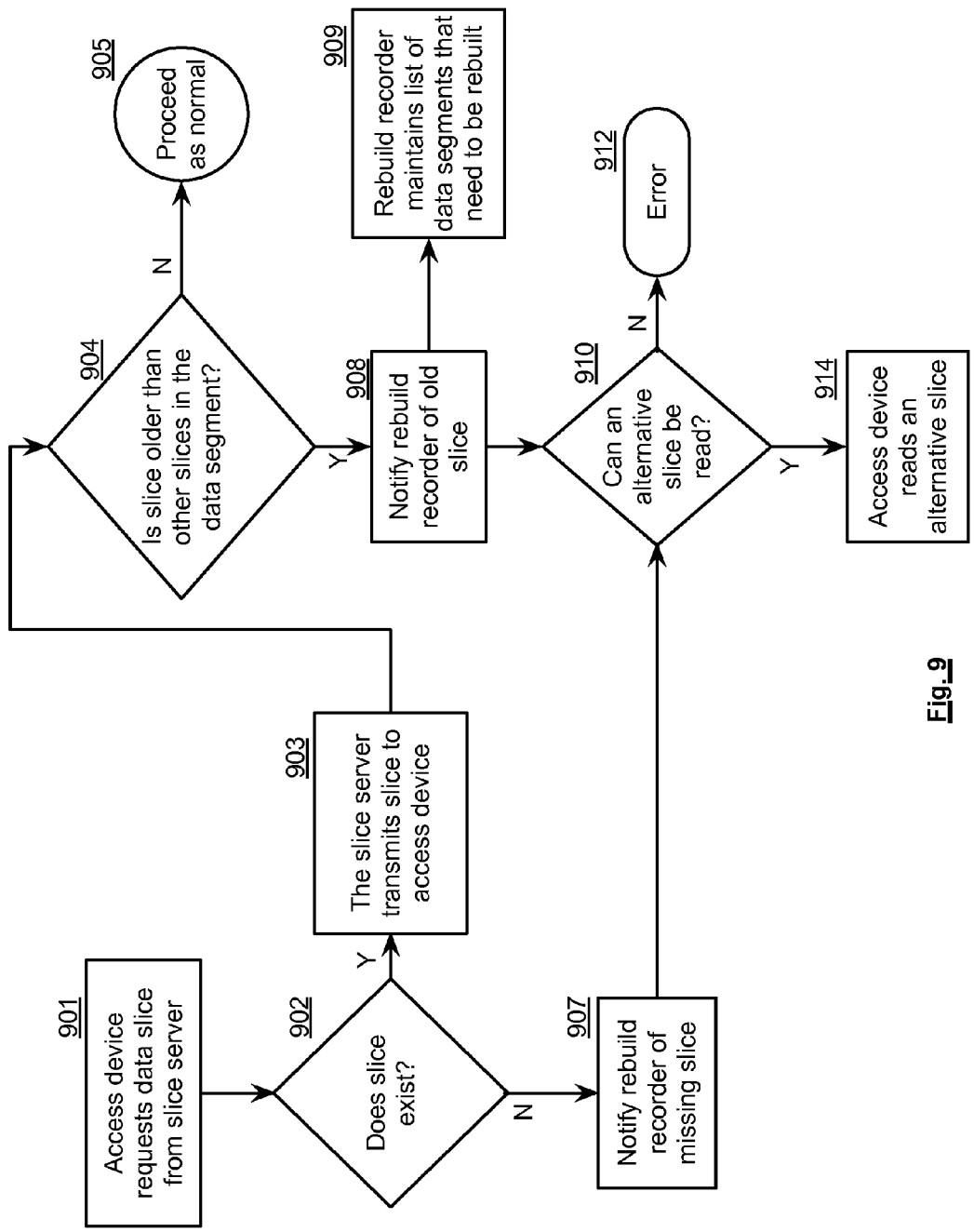
FIG. 9 is a flowchart illustrating a process for discovery of missing or outdated slices during the course of a normal read operation, in accordance with an embodiment of the disclosed invention.

FIG. 9 depicts a normal read operation from a dispersed data storage network, illustrating in particular the process by which missing and outdated slices may be discovered. During the read operation, an access device requests a data slice from a slice server in step 901. In step 902, the data slice server returns the data slice or an error indicating that the requested data slice does not exist. If the requested data slice does not exist, in step 907 the rebuilder application is notified of the missing slice. Otherwise, in step 903, the slice server transmits the requested slice to the access device. In step 904, the transaction identifier of the data slice that was read is compared to the transaction identifiers of the other data slices that make up the data segment. If the transaction identifier matches the most recent transaction identifier of the other data slices used to reconstruct the data segment, the read proceeds as normal in step 905. However, if the transaction identifiers do not match, the read operation will pass a message to the rebuilder application operating on the dispersed data storage network indicating that the requested data slice is too old in step 908. The rebuild recorder in step 909 inserts or updates a RebuildRecord with the data slice identifier corresponding to the outdated or missing data slice into its rebuild list so that the outdated or missing data slice may be rebuilt. In step 910, the grid access computer determines if an alternative data slice can be read from a different slice server. If an alternative data slice does not exist, the grid access computer will report an error in step 912. In step 914, the grid access computer reads the alternative data slice.

Figure 10:
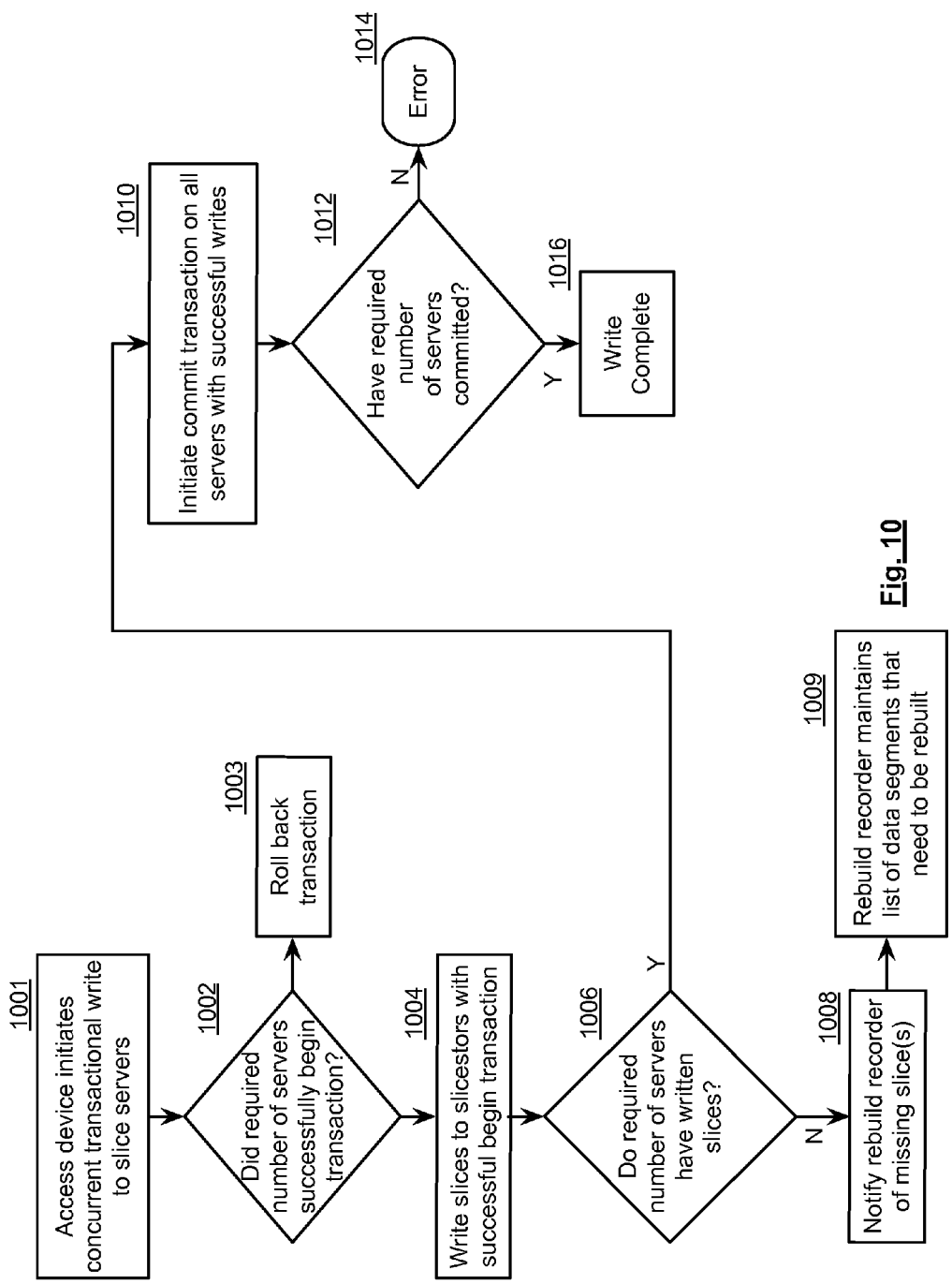
FIG. 10 is a flowchart illustrating a process for discovery of missing slices during the course of a normal write operation, in accordance with an embodiment of the disclosed invention.

FIG. 10 depicts a normal write operation to a dispersed data storage network, illustrating in particular the process by which missing slices may be recorded during this process. In step 1001, the normal write process begins, initiating concurrent transactional writes to the slice servers of all the data slices associated with a data segment. If the minimum required number of slice servers cannot be successfully written in step 1002, [Step 1002 might need N or Y on arrows pointing to 1003 and 1004 to make clear] then in step 1003, the write transaction is rolled back. If, on the other hand, the minimum required number of slice servers is available, the data slices are written to the available slice servers. If the required number of data slices were written in step 1006, then a commit transaction is initiated in step 1010. If the commit succeeds on the required number of slice servers in step 1012 then the write is successful; otherwise, a write error is returned to the calling program in step 1014.

Step 1008 illustrates that if the write operation has determined that some number of slice servers was not able to write a data slice for a data segment, then the rebuild recorder is notified in step 1008 so that the missing data slices may be written in the future. In step 1009, the rebuild recorder inserts or updates a RebuildRecord for each missing data slice into its rebuild list so that the missing data slices can be "rebuilt" at a later time.

Figure 11:
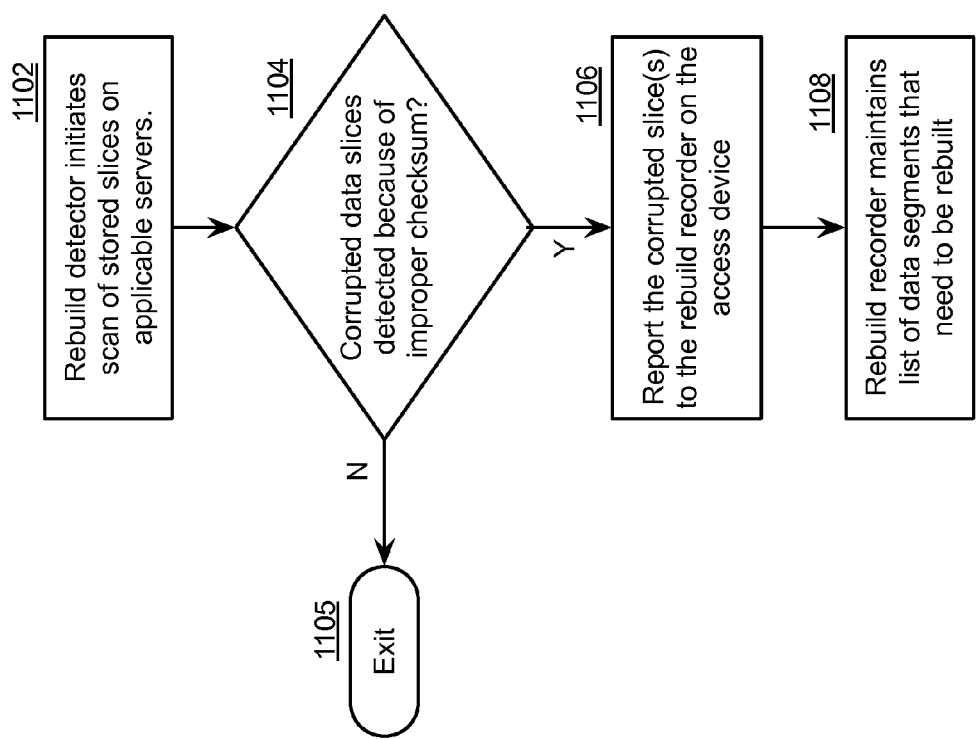
FIG. 11 is a flowchart illustrating a data scan that detects corrupt data slices, in accordance with an embodiment of the disclosed invention.

FIG. 11 is a flow chart illustrating one of the scans performed by the rebuild detector, namely the scan for corrupted data slices. In step 1102, a scan of data slices held by each slice server is initiated by a rebuilder application operating somewhere on the dispersed data storage network. Once initiated, each slice server scans its own data slices by calculating a new checksum for each slice and comparing that checksum to the checksum appended to the stored data slice. If no corrupted data slice is found in step 1104, the corrupted slice detection process is exited in step 1105. However, if a corrupted slice is detected because of a failed integrity check, execution proceeds to step 1106, where the rebuild detector determines what data segment corresponds to the corrupted data slice, and reports that information to the rebuild recorder. In step 1108, the rebuild recorder inserts or updates a Rebuild Record including the corrupted data slice's information into its rebuild list.

Figure 12:
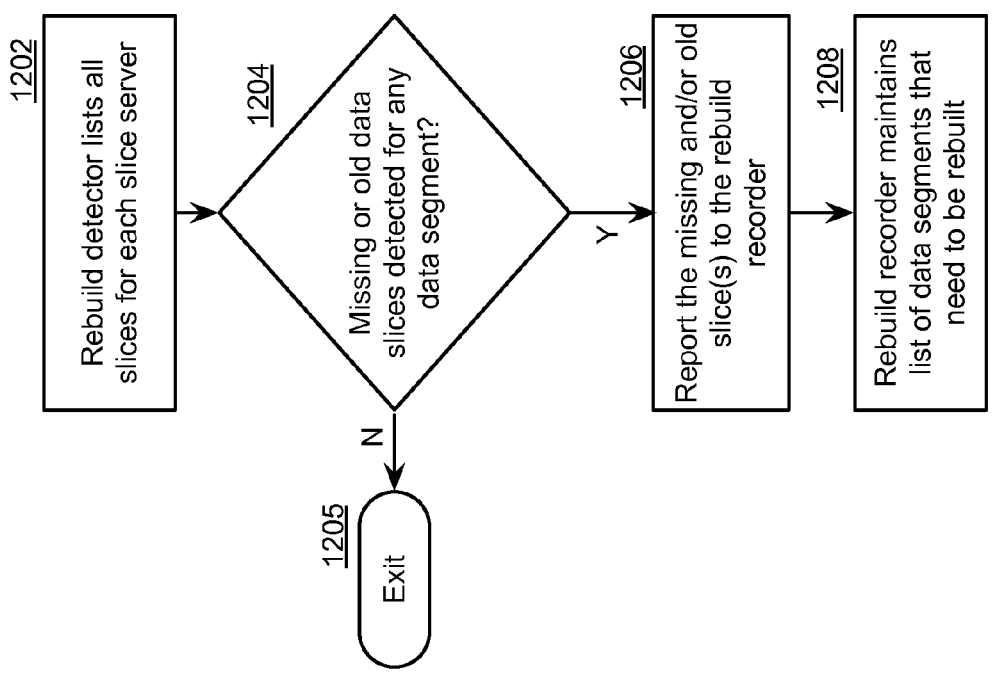
FIG. 12 is a flowchart illustrating a data scan that detects missing and outdated data slices, in accordance with an embodiment of the disclosed invention.

FIG. 12 is a flow chart illustrating the other scan performed by the rebuild detector, namely the scan for missing or outdated data slices. In step 1202, a scan of data slices is initiated by a rebuilder application operating somewhere on the dispersed data storage network. The rebuild detector asks each slice server for a list of the data slices contained on that server. In step 1204, the separate lists are processed in tandem with each other so that data slices from each data segment can be compared. If no missing or outdated data slice is found in step 1204, the missing or outdated slice detection process is exited in step 1205. However, if a slice is missing or a slice is determined to be older than the other slices in the data segment by comparing the transaction identifiers associated with the data slices, execution proceeds to step 1206, where the rebuilder application reports information necessary to identify any outdated or missing data slices to the rebuild recorder. In step 1208, the rebuild recorder inserts or updates Rebuild Records corresponding to the missing or outdated data slices into its rebuild list so that the identified data slices may be rebuilt.

FIG. 13 shows an example Rebuild Record, containing the data used to record data slices that need to be rebuilt.

Figure 14:
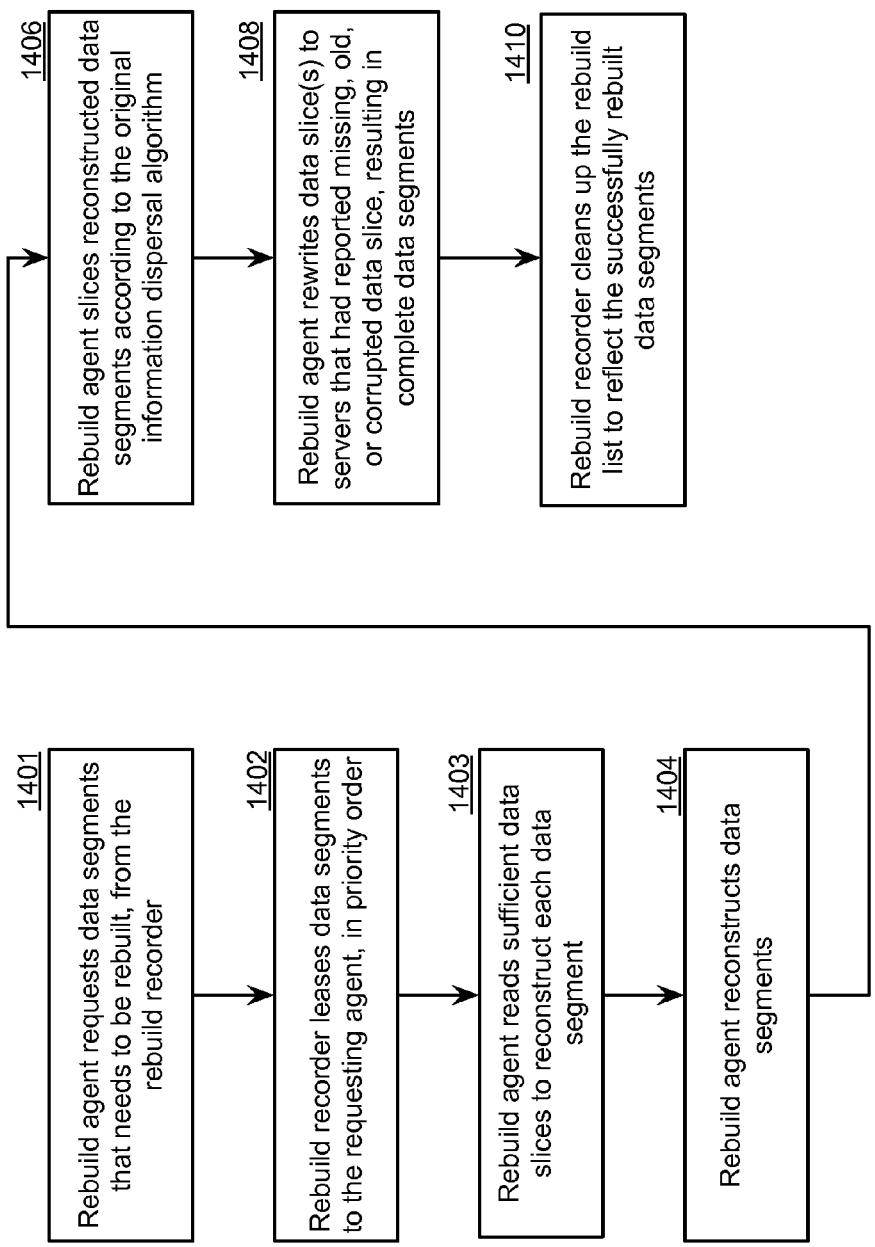
FIG. 14 is a flowchart illustrating a process that rebuilds missing, outdated, or corrupt data slices, in accordance with an embodiment of the disclosed invention.

FIG. 14 illustrates the rebuilding of missing, outdated, or corrupt data slices which were detected and recorded in the preceding processes. The rebuild agent is responsible for this activity. In step 1401 a rebuild agent is initiated by a configurable time-based trigger, and requests data segments that need to be rebuilt from the rebuild recorder. In step 1402 the rebuild recorder responds with said data segments, if any exist. The data segments are prioritized, with the segments with the most compromised slices being sent first. For each data segment sent, in step 1403 the rebuild agent reads sufficient data slices from the slice servers to reconstruct the data segment. It then reconstructs the data segment in step 1404, and re-slices it in step 1406. Since the same information dispersal algorithm is used, the missing, outdated, or corrupt slices are recreated exactly as they were or would have been originally. In step 1408, the missing, outdated, or corrupt data slices are written to the appropriate slice servers. When this is complete, the rebuild agent returns the results to the rebuild recorder so the rebuild recorder in step 1410 can make its list up to date. It deletes rebuild records that were successfully rebuilt. It un-leases the records which were not successfully rebuilt so that they will be provided again in the next iteration of the rebuild agent process.

FIG. 15 illustrates the specific operation of the rebuild detector. As depicted, data concerning five data segments has been gathered by the rebuild detector, which actively queries slice servers about data segments which the slice servers store. Table 1 shows the transaction identifier associated with data slices held by three slice servers for five separate data segments. Further, for the depicted system, at least two data slices are required to rebuild a data segment. Rows 1512, 1514, 1516, 1518, and 1520 correspond to the stored data segments, and columns 1502, 1504, and 1506 correspond to the slice servers holding the data slices. For data segment 0, which is depicted by row 1512, the data slices stored by all three slice servers were stored during transaction 100, and therefore, the transaction identifier associated with each data slice is 100. As none of these data slices are outdated or missing, none of these data slices will be noted as compromised. However, in regards to data segment 1, slice servers A and C hold data slices that were written during transaction 99, while slice server B holds no data slice at all. This may have occurred because an extended outage prevented the data slice from being written at all, or the portion of a hard disk holding the data slice may have failed. Accordingly, the data slice that should have been held by slice server B is noted as compromised and added to the rebuild list. It may further be marked as missing as opposed to outdated or corrupted.

Data segment 2, which is represented by row 1516, also has no outdated, missing, or corrupted data slices, and therefore, no entry will be made in the rebuild list corresponding to data segment 2. However, in regards to data segment 3, which is represented by row 1518, the data slice stored by slice server C was stored during transaction 100, while the data slices stored by slice servers A and B were stored during transaction 101. Accordingly, the data slice stored by slice server C is likely outdated, and is added to the rebuild list.

Data segment 4 illustrates a case where a stored data segment cannot necessarily be rebuilt. In this case, the data slice stored by slice server A was stored during transaction 102, while the data slice stored by slice server B was stored during transaction 99. In addition, the data slice held by slice server C has become corrupted. As a minimum of two data slices are required to reconstruct a data segment in this example, and only one fully updated data slice is available, it is possible that data segment 4 may no longer be re-buildable. Nonetheless, as two data slices are available, albeit one of them may be outdated, a rebuild operation will be attempted. As with all rebuilt data segments, after a data segment is reconstructed using the correct information dispersal algorithm, the checksum of the rebuilt data segment is computed and checked against the checksum appended to the data segment. Assuming the checksums match, the data segment is intact, and it will be re-sliced, and the transaction number for each data slice set to the most recent transaction, i.e., 102 in this case.

As illustrated, the process of detecting missing and outdated data slices involves comparing the data slices stored by each slice server. As the number of stored data segments may be extremely large, a complete representation of every stored data slice may be too large to hold in memory. Thus multiple iterations, each producing a partial list of stored data slices, may be required in order to process all stored slices. Such a process would proceed on a data segment by data segment basis, with information about all data slices comprising some number of particular data segments being pulled and analyzed during each iteration.

Figure 16:
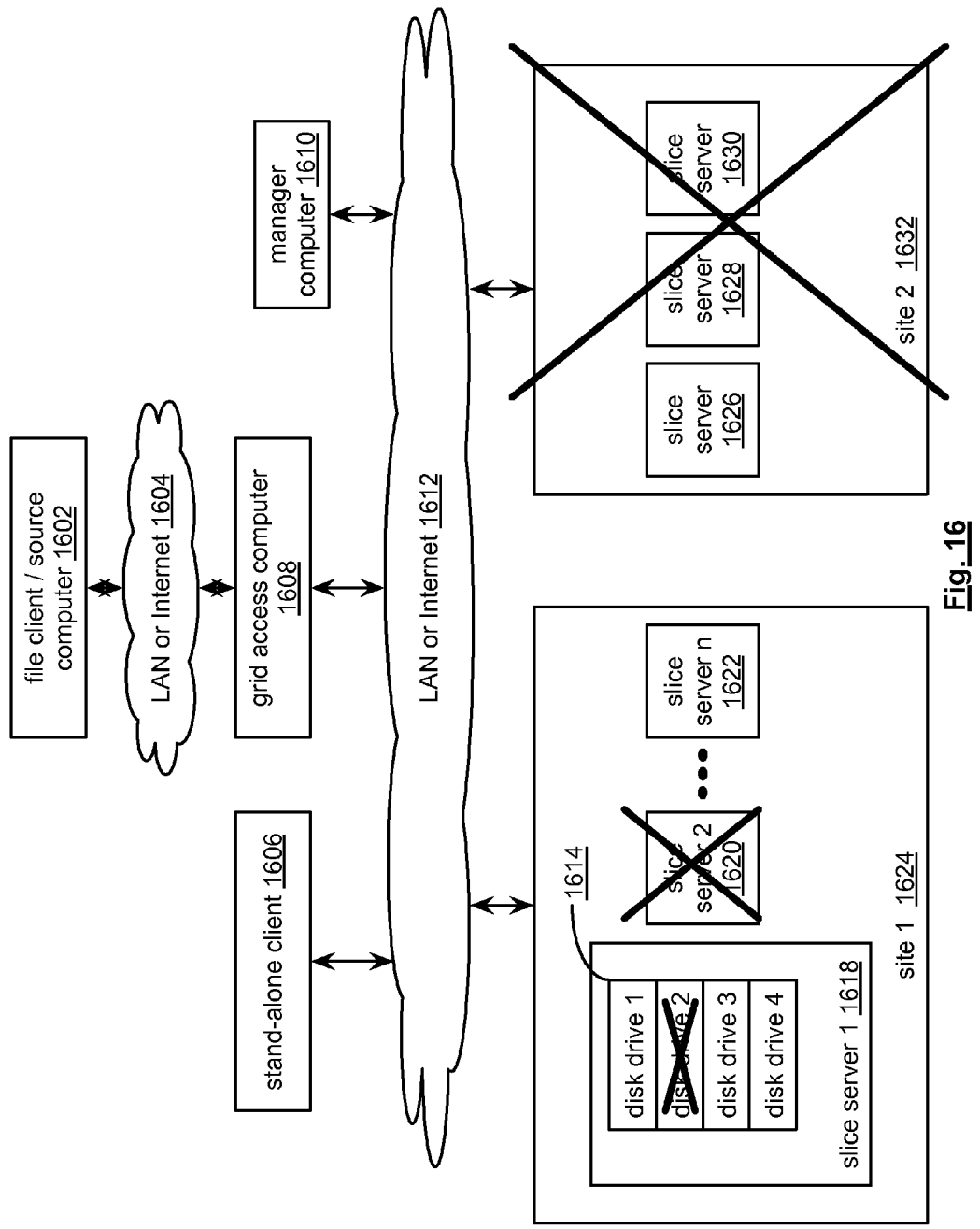
FIG. 16 is a network diagram of a dispersed data storage network constructed in accordance with an embodiment of the disclosed invention.

During operation of a dispersed data storage network an event may occur where a large number of related data slices are simultaneously destroyed, corrupted, or otherwise rendered permanently unusable. Examples of such events are depicted in FIG. 16. FIG. 16 depicts a dispersed data storage network including a number of data storage sites 1624 and 1632 each comprising a number of slice servers. 1602-1612 in figure, not in text For example, data storage site 1624 includes slice servers 1618, 1620, and 1622. In addition, as depicted, each slice server has access to four drives; for example, slice server 1618 has access to four drives labeled disk drive 1 through disk drive 4. Note that these drives could be integrated into the server, or could be external drives accessible via a data connection, such as a USB connection, or a network connection. Furthermore, any number of drives could be accessed by any slice server, and four drives are depicted only for illustrative purposes. It should be noted that each drive potentially holds millions of data slices. In one embodiment of the disclosed invention, each slice is assigned a sequential slice identifier, with a range of data slices being uniquely assigned to a drive; for example, a drive could hold data slices with identifiers 0 through 1,000,000. In a separate embodiment of the disclosed invention, slices stored on a particular drive need not be identified using sequential identifiers. However, a database, which could be stored anywhere within the dispersed data storage network, would relate slice identifiers to slice servers as well as particular disks.

Site 1 1624 depicts two potential scenarios where a large number of related data slices are rendered inaccessible. Slice server 1618 has a number of drives 1614 associated with it. As depicted, four drives are shown associated with slice server 1618. These drives could be incorporated within the server, or merely accessible by the server. Further, the number four is arbitrary, and any reasonable number of drives could accessible by any slice server.

In one possible scenario disk drive 2, which is accessible by slice server 1618, has been rendered inaccessible by an event, such as, for example, drive failure or switching out the drive. In this example, all data slices stored by disk drive 2 are inaccessible, and a rebuilder application operating on the dispersed data storage network is notified of the inaccessibility of the data slices stored on disk drive 2. In a second scenario, slice server 1620 has been rendered permanently inaccessible by an event, such as, for example, an electrical fire. In this scenario, a rebuilder application operating on the dispersed data storage network is notified of the inaccessibility of all data slices stored on the slice server 1620.

FIG. 16 depicts one additional scenario that would render a large number of data slices inaccessible. This additional scenario is the destruction of an entire storage site 1632. In this scenario, a rebuilder application operating on the dispersed data storage network is notified of the inaccessibility of all data slices stored by the storage site 1632. While three potential scenarios rendering a large number of data slices inaccessible are depicted in FIG. 16, these are shown only for illustrative purposes, and should not be construed as limiting the invention in any way.

Figure 17:
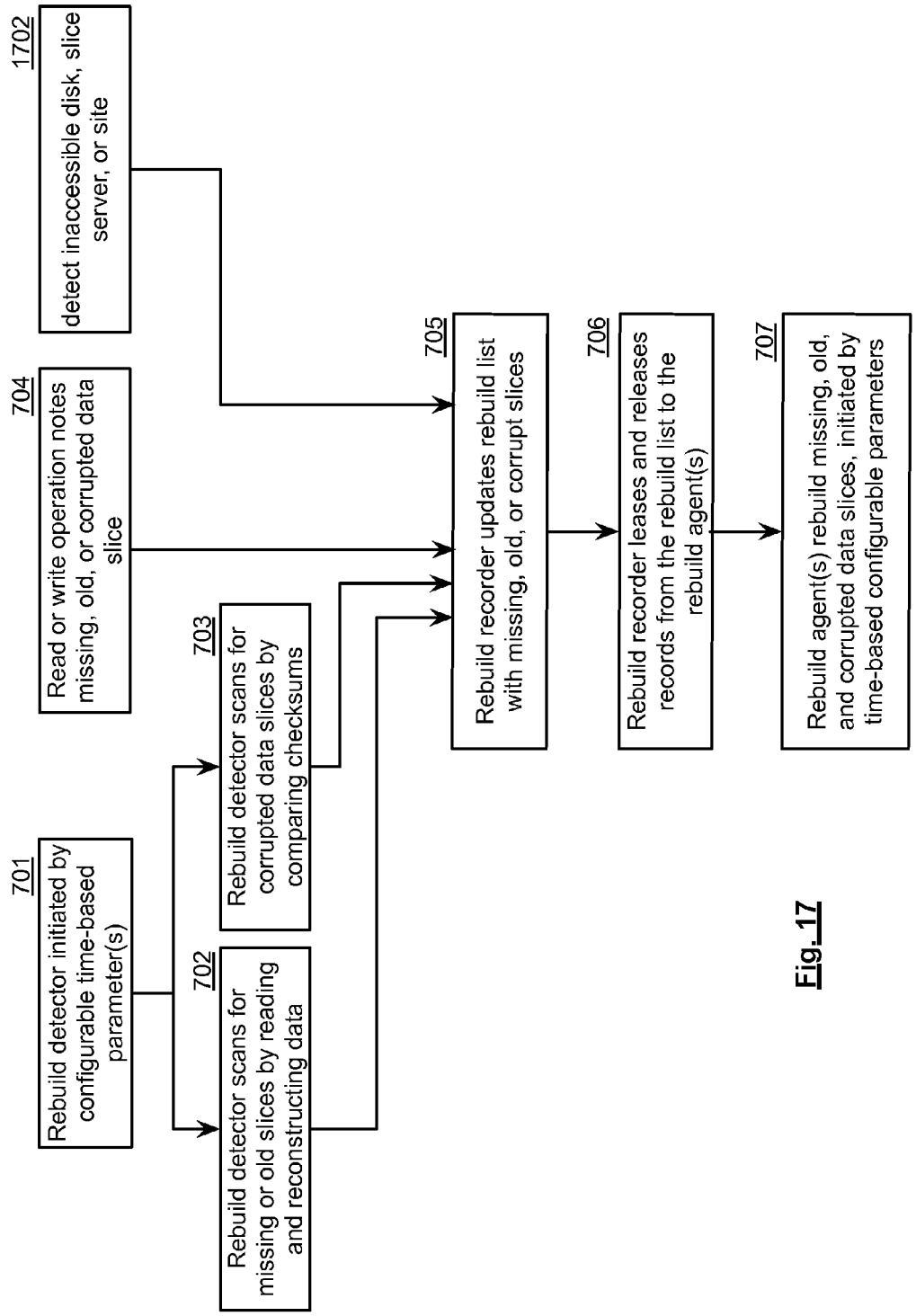
FIG. 17 is a flowchart illustrating the high-level operation of a rebuild process in accordance with an embodiment of the disclosed invention.

FIG. 17 depicts the high-level operation of the rebuilder as optimized in accordance with the disclosed invention. In this embodiment of the disclosed invention, the rebuilder operates identically to the disclosure of FIG. 7, with the addition of step 1702, where an inaccessible disk, slice server, or site is detected. As previously discussed, the disk, slice server, or site could have been destroyed or otherwise compromised so as to render the stored or maintained data slices inaccessible. As in the earlier disclosed version of the rebuilder, identifiers corresponding to the data slices associated with the inaccessible disk, slice server, or site are added to a rebuild list in step 705, and the remainder of the rebuilder's operation is as specified earlier in FIG. 7 and its accompanying text.

Figure 18:
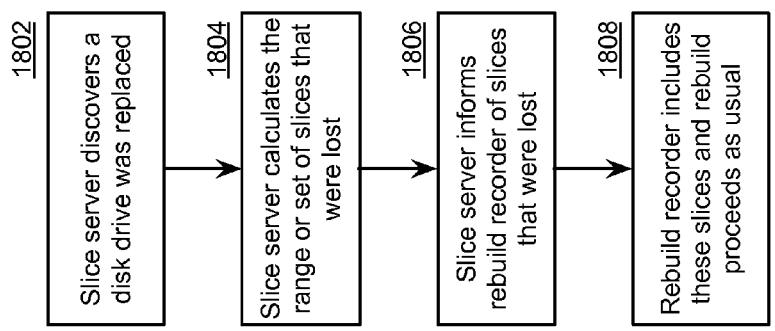
FIG. 18 is a flowchart illustrating the high-level operation of how a disk failure would be detected and the data slices stored by the disk would be rebuilt in accordance with an embodiment of the disclosed invention.

FIG. 18 illustrates the process by which the data slices stored by an inaccessible drive may be captured and added to a rebuild list. In step 1802, a slice server discovers that a disk drive has become inaccessible. The slice server then calculates the range or set of slices that have become inaccessible in step 1804. The slice server generates a message informing the rebuild recorder of the inaccessible slices in step 1806, and in step 1808, the rebuild recorder notes the inaccessible slices and rebuilding proceeds as normal.

Figure 19:
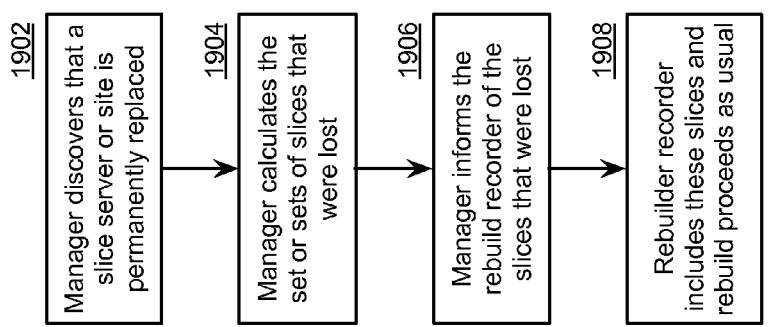
FIG. 19 is a flowchart illustrating the high-level operation of how the destruction of a slice server or an entire site would be detected and the data slices maintained by the slice server or site would be rebuilt in accordance with an embodiment of the disclosed invention.

FIG. 19 illustrates the process by which the data slices stored by an inaccessible site may be captured and added to a rebuild list. In step 1902, a manager or program, such as the rebuild detector, notes that a slice server, multiple slice servers, or an entire site have become inaccessible. In step 1904, the set or sets of slices that were lost are calculated, and in step 1906, the rebuild recorder is informed of the slices that were lost. The rebuild process proceeds as normal in step 1908.

Figure 20:
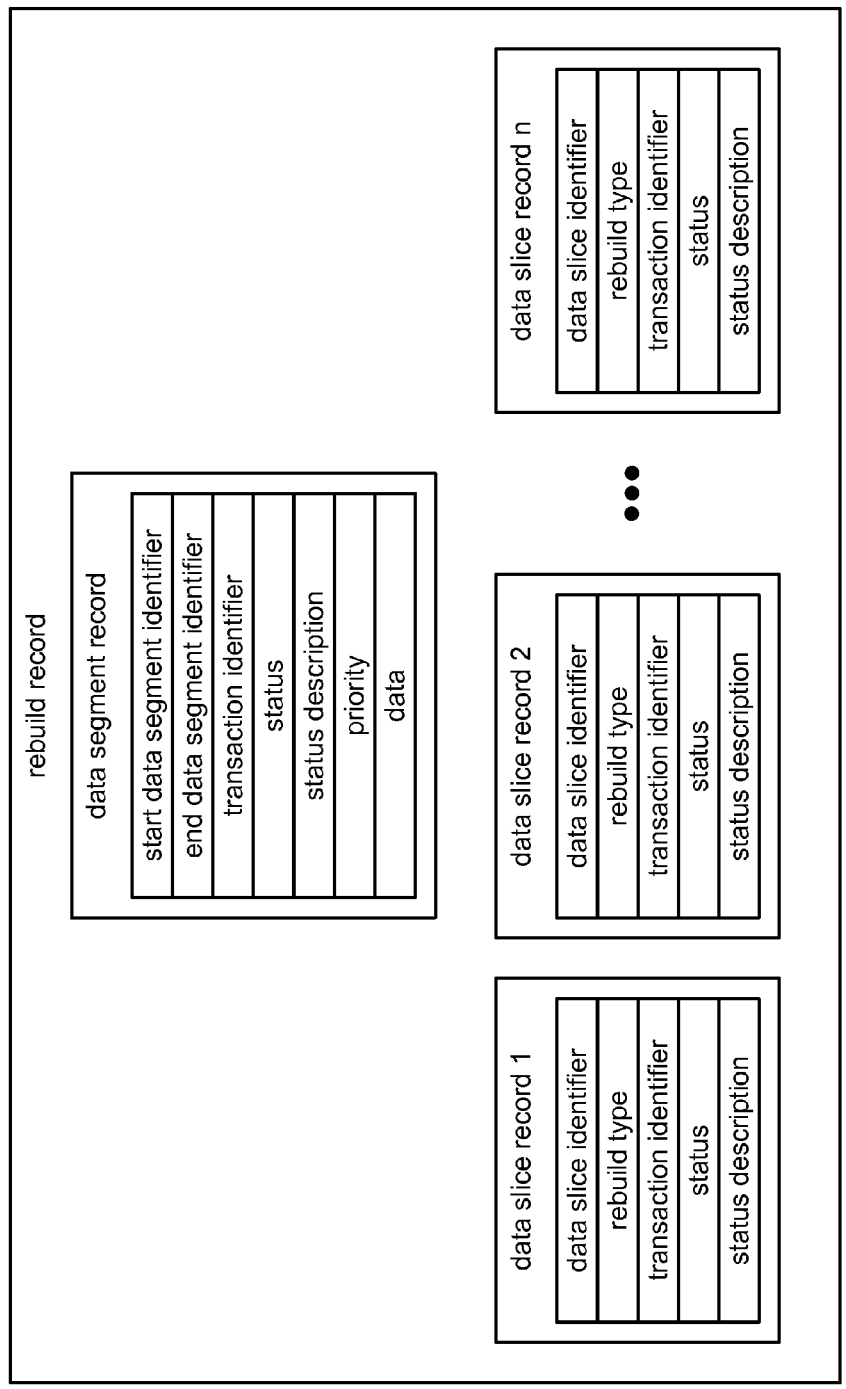
FIG. 20 is an example layout of a rebuilder layout record especially adapted for range based rebuilding.

FIG. 20 illustrates a possible record layout for a rebuild record that represents a range of data segments, instead of one data segment. Such a rebuild record would be assembled from the activities described above, such as, for example, (1) a slice server notifying the rebuilder of one or more unusable slices, (2) a client or grid access computer notifying the rebuilder of one or more unusable slices, or (3) a manager notifying the rebuilder of an incident destroying a slice server or an entire site, along with the warehoused data slices. As noted in FIG. 20, in the illustrated embodiment a rebuild record comprises one data segment record and one or more data slice records, with the data slice records representing the data slices required to assemble the data segment represented by the data segment record. The structure of the rebuild record is identical to that discussed above regarding FIG. 13, with the exception that "start data segment identifier" and "end data segment identifier" are used in place of "data segment identifier" so that a range of data segments can be represented.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method for execution by one or more computers associated with a dispersed data storage network, the method comprises:
    identifying, by a first rebuilder application operating on a first slice server, a data slice having a storage error;
    identifying, by the first rebuilder application or by a second rebuilder application operating on a second slice server, a data segment based on the identified data slice, wherein the data segment was encoded in accordance with an information dispersal function to produce a set of data slices, which includes the identified data slice;
    identifying, by the second rebuilder application operating on the second slice server, one or more other slice servers that are storing other data slices of the set of data slices;
    retrieving, by the second rebuilder application operating on the second slice server from the one or more other slice servers, a sufficient number of the other data slices to reconstruct the data segment;
    decoding, by the second rebuilder application operating on the second slice server, the sufficient number of the other data slices in accordance with the information dispersal function to reconstruct the data segment;
    encoding, by the second rebuilder application operating on the second slice server, the reconstructed data segment in accordance with the information dispersal algorithm to produce a new set of data slices; and
    selecting, by the second rebuilder application operating on the second slice server, a data slice of the new set of data slices as a rebuilt data slice of the identified data slice.

2. The method of claim 1 further comprises:
    outputting, by the second rebuilder application operating on the second slice server, the rebuilt data slice to the first slice server for storage therein.

3. The method of claim 1, wherein the identifying the data slice comprises:
    performing, by a rebuild detector of the first or second rebuilder application, a storage error detection process to identify the storage error, wherein the storage error is one of: a missing data slice, an outdated data slice, and a corrupted data slice.

4. The method of claim 1, wherein the identifying the data segment comprises:
    generating, by a rebuild recorder of the first or second rebuilder application, a rebuild record based on the identified data slice, wherein the rebuild record includes one or more of: an identifier of the identified data slice, an identifier associated with the data segment, a transaction identifier associated with the data segment, and identifiers of the other data slices.

5. The method of claim 1 further comprises:
    releasing, by a rebuild recorder of the second rebuilder application, a rebuild record regarding the identified data slice and the data segment to a rebuild agent of the second rebuilder application;
    decoding, by the rebuild agent, the sufficient number of the other data slices by:
        arranging the sufficient number of other data slices into a reconstructed coded matrix; and
        decoding the reconstructed coded matrix using a decoding matrix function in accordance with the information dispersal algorithm to reconstruct the data segment; and
    encoding, by a rebuild agent, the reconstructed data segment by:
        arranging the reconstructed data segment into the data matrix;
        encoding the data matrix using an encoding matrix function in accordance with the information dispersal algorithm to produce a coded matrix; and
        arranging the coded matrix into the new set of data slices.

6. A method for execution by one or more computers associated with a dispersed data storage network, the method comprises:
    identifying, by a plurality of rebuilder applications operating on the one or more computers, a plurality of data slices having storage errors;
    allocating a first set of the plurality of data slices having storage errors to a first rebuilder application of the plurality of rebuilder applications;
    allocating a second set of the plurality of data slices having storage errors to a second rebuilder application of the plurality of rebuilder applications;
    for a first data slice of the first set of the plurality of data slices:
        identifying, by the first rebuilder application, a first data segment based on the first data slice, wherein the first data segment was encoded in accordance with an information dispersal function to produce a first set of data slices, which includes the first data slice;
        identifying, by the first rebuilder application, one or more other slice servers that are storing other data slices of the first set of data slices;
        retrieving, by the first rebuilder application from the one or more other slice servers, a sufficient number of the other data slices to reconstruct the data segment;
        decoding, by the first rebuilder application, the sufficient number of the other data slices in accordance with the information dispersal function to reconstruct the first data segment;
        encoding, by the first rebuilder application, the reconstructed first data segment in accordance with the information dispersal algorithm to produce a new first set of data slices; and
        selecting, by the first rebuilder application, a data slice of the new first set of data slices as a rebuilt first data slice of the first data slice.

7. The method of claim 6 further comprises:
    for a second data slice of the second set of the plurality of data slices:
        identifying, by the second rebuilder application, a second data segment based on the second data slice, wherein the second data segment was encoded in accordance with the information dispersal function to produce a second set of data slices, which includes the second data slice;
        identifying, by the second rebuilder application, another one or more other slice servers that are storing second other data slices of the second set of data slices;

retrieving, by the second rebuilder application from the other one or more other slice servers, a sufficient number of the second other data slices to reconstruct the second data segment;

decoding, by the second rebuilder application, the sufficient number of the second other data slices in accordance with the information dispersal function to reconstruct the second data segment;

encoding, by the second rebuilder application, the reconstructed second data segment in accordance with the information dispersal algorithm to produce a new second set of data slices; and selecting, by the second rebuilder application, a data slice of the new second set of data slices as a rebuilt second data slice of the second data slice.

8. The method of claim 6 further comprises:

allocating the first set of the plurality of data slices having storage errors to the first rebuilder application based on data slices falling within a first address range; and allocating the second set of the plurality of data slices having storage errors to the second rebuilder application based on data slices falling within a first address range.

9. A dispersed data storage network comprises:

a first slice server that includes:
   a first network interface for interfacing with a network;
   first memory for storing first data slices and for storing a first rebuilder application; and
   a first central processing unit operable to execute the first rebuilder application; and a second slice server that includes:
   a second network interface for interfacing with the network;
   second memory for storing second data slices and for storing a second rebuilder application; and
   a second central processing unit operable to execute the second rebuilder application, wherein, when the first and second central processing units are executing the first and second rebuilder applications:
      the first rebuilder application identifies a data slice of the first data slices to produce an identified data slice, wherein the identified data slice has a storage error;
      the first rebuilder application or the second rebuilder application identifies a data segment based on the identified data slice, wherein the data segment was encoded in accordance with an information dispersal function to produce a set of data slices, which includes the identified data slice;
      the second rebuilder application:
         identifies one or more other slice servers that are storing other data slices of the set of data slices;
         retrieves, from the one or more other slice servers, a sufficient number of the other data slices to reconstruct the data segment;
         decodes the sufficient number of the other data slices in accordance with the information dispersal function to reconstruct the data segment;
         encodes the reconstructed data segment in accordance with the information dispersal algorithm to produce a new set of data slices; and
         selects a data slice of the new set of data slices as a rebuilt data slice of the identified data slice.

10. The dispersed data storage network of claim 9 further comprises:

the second rebuilder application outputting the rebuilt data slice to the first slice server for storage therein.

11. The dispersed data storage network of claim 9, wherein the first rebuilder application identifies the data slice by:

performing, by a rebuild detector of the first rebuilder application, a storage error detection process to identify the storage error, wherein the storage error is one of: a missing data slice, an outdated data slice, and a corrupted data slice.

12. The dispersed data storage network of claim 9, wherein the first or second rebuilder application identifies the data segment by:

generating, by a rebuild recorder of the first or second rebuilder application, a rebuild record based on the identified data slice, wherein the rebuild record includes one or more of: an identifier of the identified data slice, an identifier associated with the data segment, a transaction identifier associated with the data segment, and identifiers of the other data slices.

13. The dispersed data storage network of claim 9 further comprises:

releasing, by a rebuild recorder of the second rebuilder application, a rebuild record regarding the identified data slice and the data segment to a rebuild agent of the second rebuilder application;

decoding, by the rebuild agent, the sufficient number of the other data slices by:
   arranging the sufficient number of other data slices into a reconstructed coded matrix; and
   decoding the reconstructed coded matrix using a decoding matrix function in accordance with the information dispersal algorithm to reconstruct the data segment; and encoding, by a rebuild agent, the reconstructed data segment by:
   arranging the reconstructed data segment into the data matrix;
   encoding the data matrix using an encoding matrix function in accordance with the information dispersal algorithm to produce a coded matrix; and
   arranging the coded matrix into the new set of data slices.

* * * * *

UNITED STATES PATENT AND TRADEMARK OFFICE
CERTIFICATE OF CORRECTION

PATENT NO. : 8,713,358 B2  Page 1 of 1
APPLICATION NO. : 13/914232
DATED : April 29, 2014
INVENTOR(S) : Thornton et al.

It is certified that error appears in the above-identified patent and that said Letters Patent is hereby corrected as shown below:

Title Page, item (72) Inventors: Replace "Vance T. Thorton" with --Vance T. Thornton--

Signed and Sealed this
Twenty-third Day of December, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,713,358 B2  
APPLICATION NO.   : 13/914232  
DATED             : April 29, 2014  
INVENTOR(S)       : Thornton et al.

Page 1 of 1

It is certified that error appears in the above-identified patent and that said Letters Patent is hereby corrected as shown below:

Title Page, item (12) "Thorton et al." should read --Thornton et al.--.

Title Page, item (72) Inventors: Replace "Vance T. Thorton" with --Vance T. Thornton--.

This certificate supersedes the Certificate of Correction issued December 23, 2014.

Signed and Sealed this  
Twenty-fourth Day of March, 2015

Michelle K. Lee  
*Director of the United States Patent and Trademark Office*